US012762519B2

(12) United States Patent
Binder et al.

(10) Patent No.: US 12,762,519 B2
(45) Date of Patent: Oct. 13, 2026

(54) SMART CONTRACT DIRECTORY SERVICES

(71) Applicant: TOKENFORM LLC, Denver, CO (US)

(72) Inventors: Jeffrey Binder, Denver, CO (US); Charles Hasek, Denver, CO (US); Lindsay Gardner, West Hollywood, CA (US)

(73) Assignee: TOKENFORM LLC, Denver, CO (US)

( * ) Notice: Subject to any disclaimer, the term of this patent is extended or adjusted under 35 U.S.C. 154(b) by 0 days.

(21) Appl. No.: 18/968,784

(22) Filed: Dec. 4, 2024

(65) Prior Publication Data

US 2025/0094944 A1 Mar. 20, 2025

Related U.S. Application Data

(63) Continuation-in-part of application No. 18/431,666, filed on Feb. 2, 2024.

(60) Provisional application No. 63/443,284, filed on Feb. 3, 2023.

(51) Int. Cl.
*G06Q 20/06* (2012.01)
*G06F 8/71* (2018.01)
*G06Q 20/40* (2012.01)

(52) U.S. Cl.
CPC ............... *G06Q 20/06* (2013.01); *G06F 8/71* (2013.01); *G06Q 20/40* (2013.01); *G06Q 2220/00* (2013.01)

(58) Field of Classification Search
CPC .... G06Q 20/06; G06Q 20/40; G06Q 2220/00; G06Q 20/3274; G06Q 20/363; G06Q 20/3674; G06Q 20/405; G06Q 20/065
USPC ............................................................ 705/35
See application file for complete search history.

(56) References Cited

U.S. PATENT DOCUMENTS

| | | | | |
|---|---|---|---|---|
| 11,816,453 | B1 * | 11/2023 | Dowling | G06F 8/311 |
| 12,184,758 | B2 * | 12/2024 | Feola | G06Q 20/389 |
| 2019/0158275 | A1 * | 5/2019 | Beck | G06Q 20/0658 |
| 2019/0392438 | A1 | 12/2019 | Rice | |
| 2020/0320529 | A1 | 10/2020 | Lyadvinsky et al. | |
| 2021/0406920 | A1 | 12/2021 | McLaney | |
| 2022/0122072 | A1 | 4/2022 | Kang et al. | |

(Continued)

FOREIGN PATENT DOCUMENTS

EP 3474518 A1 4/2019

OTHER PUBLICATIONS

Das, Dipanjan et al. "Understanding Security Issues in the NT Ecosystem" (2021) arxiv.org, Cornell University Library, Ithaca, NY.

*Primary Examiner* — Clifford B Madamba
(74) *Attorney, Agent, or Firm* — Brownstein Hyatt Farber Schreck, LLP

(57) ABSTRACT

A first smart contract references a second smart contract at a first address. A directory service, which may be implemented using one or more systems, smart contracts, non-fungible tokens, and so on, routes requests to execute the second smart contract from the first address to a second address where the second smart contract is stored. This enables the second smart contract to be moved, modified, replaced, and so on despite the reference to the first address in the first smart contract being fixed without requiring the first smart contract to be replaced.

20 Claims, 24 Drawing Sheets

(56) References Cited

U.S. PATENT DOCUMENTS

| | | | |
|---|---|---|---|
| 2022/0210061 A1* | 6/2022 | Simu | H04L 9/3239 |
| 2022/0253866 A1* | 8/2022 | Tedesco | G06N 5/04 |
| 2022/0376889 A1* | 11/2022 | Kaizer | H04L 9/0891 |
| 2023/0045071 A1 | 2/2023 | Kalaldeh et al. | |
| 2023/0196341 A1 | 6/2023 | Quigley et al. | |
| 2023/0196353 A1 | 6/2023 | Jakobsson et al. | |
| 2023/0289782 A1* | 9/2023 | Lan | G06Q 20/382 |
| 2023/0318833 A1 | 10/2023 | Haber et al. | |

* cited by examiner

SMART CONTRACT DIRECTORY SERVICES

CROSS REFERENCE TO RELATED APPLICATION

This application is a Continuation-in-Part of U.S. Non-provisional patent application Ser. No. 18/431,666, filed Feb. 2, 2024, and titled "Non-Fungible Token Directory Services," which claims the benefit of U.S. Provisional Patent Application No. 63/443,284, filed Feb. 3, 2023, and titled "Non-Fungible Token Directory Services," the contents of which are incorporated herein by reference in their entirety.

FIELD

The described embodiments relate generally to directory services. More particularly, the present embodiments relate to directory services for smart contracts.

BACKGROUND

A blockchain is a distributed ledger that is shared among nodes of a decentralized computer network. Blockchains are similar to databases in that they store information electronically in digital format. However, unlike a database, blockchains collect information together in groups, known as blocks. As blocks are filled they are closed, timestamped, and linked to a previously filled block. This data structure inherently makes an irreversible timeline of data when implemented in a decentralized nature.

One use of blockchains is to store non-fungible tokens (NFTs). NFTs are cryptographic assets on a blockchain with unique identification codes and metadata that distinguish them from each other. NFTs are typically used to represent rights to real world assets, such as artworks. NFTs are associated with a smart contract stored on the blockchain that controls transactions that can be performed with the NFTs and who can perform them. NFTs are accessible using private and/or public keys stored in a local and/or cloud-based token wallet assigned to the owner of the respective NFT, and ownership is tracked on the blockchain.

OVERVIEW

The present disclosure relates to smart contract directory services. A first smart contract references a second smart contract at a first address. A directory service routes requests to execute the second smart contract from the first address to a second address where the second smart contract is stored. This enables the second smart contract to be moved, modified, replaced, and so on despite the reference to the first address in the first smart contract being fixed without requiring the first smart contract to be replaced.

In various embodiments, a system includes a non-transitory storage medium that stores instructions and a processor. The processor executes the instructions to generate a mapping between a first address at which a first smart contract references a second smart contract and a second address at which the second smart contract is stored on at least one blockchain; receive a request to execute the second smart contract at the first address in response to execution of the first smart contract; route the request to execute the second smart contract from the first address to the second address using the mapping; and change the mapping to map the first address to a third address in response to an authorized change request received via at least one communication network.

In some examples, the first smart contract is stored on the at least one blockchain.

In a number of examples, the mapping is a third smart contract that references the second address. In various examples, the mapping is at least one non-fungible token (NFT) or an asset associated with the at least one NFT.

In some examples, the second smart contract implements at least one of an application programming interface or a service. In a number of examples, the first smart contract and the second smart contract are stored on different blockchains. In various examples, at least one of the first smart contract or the second smart contract is associated with at least one NFT. In a number of examples, the first smart contract and the second smart contract are code compatible.

In some embodiments, a method includes generating a first smart contract that references a second smart contract via a first address; storing the first smart contract on at least one blockchain; instructing a directory service to generate a directory service mapping between the first address and a second address where the second smart contract is stored; and using the first smart contract to provide access to the second smart contract via the directory service mapping.

In various examples, the method further includes implementing at least one of an application programming interface or a service using the second smart contract.

In some examples, the method further includes instructing the directory service to update the second address of the directory service mapping to a third address. In a number of examples, the method further includes moving the second smart contract from the second address to the third address. In various examples, the method further includes storing a third smart contract at the third address. In some examples, instructing the directory service to update the second address of the directory service mapping to the third address comprises executing a third smart contract.

In various examples, the directory service is implemented via at least one NFT or an asset associated with the at least one NFT. In some examples, the method further includes determining whether the first smart contract and the second smart contract are code compatible.

In a number of embodiments, a computer program product tangibly embodied in at least one non-transitory computer readable medium includes first instructions stored in the at least one non-transitory computer readable medium and executable by at least one processor to implement at least one of an application programming interface gateway or a service gateway by generating a mapping between a first address, at which a first smart contract references a second smart contract, and a second address, at which the second smart contract is stored on at least one blockchain; and second instructions stored in the at least one non-transitory computer readable medium and executable by the at least one processor to provide at least one of an application programming interface or a service by routing a request to execute the second smart contract from the first address to the second address using the mapping.

In various examples, the computer program product further includes third instructions stored in the at least one non-transitory computer readable medium and executable by the at least one processor to update the mapping to change the second address to a third address. In some examples, the mapping is updated in response to generation of a new version of the second smart contract. In a number of examples, the computer program product further includes third instructions stored in the at least one non-transitory computer readable medium and executable by the at least one processor to determine that an NFT is associated with a token wallet associated with a requestor before routing the request.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
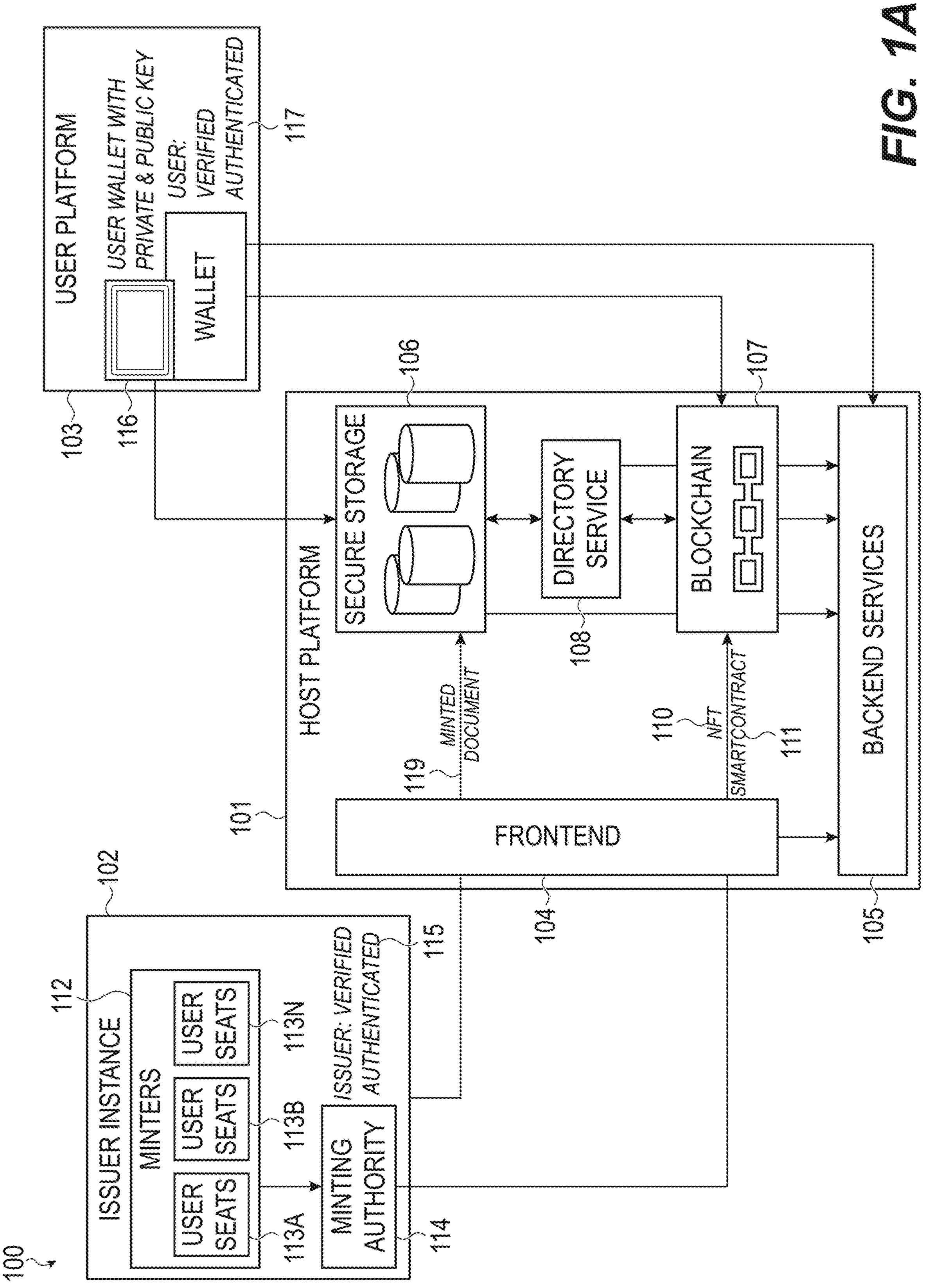
FIG. 1A depicts an example system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

A smart contract may be a computer program or a transaction protocol that may be intended to automatically execute, control, and/or document events and/or actions according to the terms of a contract or an agreement. Smart contracts may be stored on one or more blockchains.

A first smart contract may reference a second smart contract (which may be stored on the same blockchain or blockchains as the first smart contract or one or more different blockchains) such that execution of the first smart contract may execute the second smart contract. The first smart contract may reference the second smart contract at a first address (such as a uniform resource locator address). For example, the second smart contract may implement an application programming interface (API), service, and so on and the first smart contract may thus implement a gateway to that API, service, or the like.

This first address referenced in the first smart contract may be fixed. However, the address of the second smart contract may change, such as if the second smart contract is moved, modified, replaced, and so on.

The present disclosure relates to smart contract directory services. A first smart contract references a second smart contract at a first address. A directory service routes requests to execute the second smart contract from the first address to a second address where the second smart contract is stored. This enables the second smart contract to be moved, modified, replaced, and so on, despite the reference to the first address in the first smart contract being fixed without requiring the first smart contract to be replaced.

The first address points to an intermediary, either a system and/or one or more smart contracts and/or one or more NFTs that implement a directory service associated with the first address. This intermediary points to the second address where the second smart contract is stored and can be configured to change the second address. Various configurations are possible and contemplated without departing from the scope of the present disclosure.

This may add capabilities to the smart contracts and/or systems that use such that were not previously possible while improving operation of computer systems involved by reducing and/or eliminating consumption of the hardware and/or software resources that would have otherwise been used to generate replacements for the first smart contract.

In this way, the present disclosure may provide technological solutions to the fixed nature of references in smart contracts, particularly technological solutions that arise from the technological problems introduced by the changeable nature of where smart contracts may be accessed via one or more communication networks. A system and/or device using the techniques of the present disclosure may be able to provide smart contract directory services, reduce or eliminate consumption of the hardware and/or software resources that would have otherwise been used to generate replacements for the first smart contract, and/or perform various related functions that the system and/or device would not previously have been able to perform absent the technology disclosed herein. This may enable the system and/or device to operate more efficiently while consuming fewer hardware and/or software resources as more resource consuming techniques may be omitted. Further, one or more databases and/or other components may be omitted while still enabling various functions, reducing unnecessary hardware and/or software components, and providing greater system flexibility and security.

These and other embodiments are discussed below with reference to FIGS. 1A-20. However, those skilled in the art will readily appreciate that the detailed description given herein with respect to these Figures is for explanatory purposes only and should not be construed as limiting.

FIG. 1A depicts an example system 100. The system 100 (such as via a host platform 101) may perform various directory service functions. Examples of such operations are discussed in detail below with respect to FIGS. 2 and 4-16.

The system 100 may include a host platform 101 that is operable to create and/or perform one or more transactions and/or other actions related to one or more NFTs 110, smart contracts 111, and/or minted documents 119 on behalf of and/or for one or more other entities, such as one or more issuer instances 102, user platforms 103, intermediaries (not shown), and so on. Creation of the NFTs 110 may involve creation of one or more smart contracts 111, storage of the smart contracts 111 and/or the NFTs 110 in one or more blockchains, automatic creation and/or maintenance of one or more local and/or cloud-based token wallets (an electronic repository associated with storage of at least one or more private keys associated with one or more NFTs 110 and/or other tokens associated with one or more blockchains), and so on. In some cases, the private keys for the NFTs 110 and/or other encrypted and/or unencrypted data (such as one or more public keys, copies of the NFTs 110, payloads, and so on) may be stored in one or more local and/or cloud-based token wallets. The NFT document platform may also be operable to mint one or more documents, such as one or more birth certificates, contracts, and other signed documents, titles (such as house titles, car titles, and so on), prescriptions, licenses and/or identification documents, checks, money, gift cards, and so on. The smart contracts 111 and/or NFTs 110 may correspond to the one or more minted documents 119 and may even be created using data from and/or otherwise associated with the minted documents 119. The NFTs may be usable to authenticate the minted documents 119, evidence ownership of the minted documents 119, control the ability to perform transactions regarding the minted documents 119, and so on.

For example, the host platform 101 may generate a first NFT that is associated with an asset associated with a first address. The host platform 101 and/or one or more smart contracts of one or more other NFTs may implement a directory service associated with the first address. Directory services typically map the names of network resources to their respective network addresses. The directory service may receive requests at the first address and route the request directly or indirectly to a second address. The directory service may be configurable such that the second address may be changed. In this way, the asset referenced by the first NFT may be changed.

Described another way, the first NFT may include a reference to the first address that cannot be changed. In this way, the first NFT is a pointer to the first address. The first address points to an intermediary, either the host platform 101 and/or one or more smart contracts of one or more other NFTs that implement a directory service associated with the first address. This intermediary points to a second address where the asset is stored and can be configured to change the second address. Various configurations are possible and contemplated without departing from the scope of the present disclosure.

This may add capabilities to the first NFT that were not previously possible while improving operation of computer systems involved by reducing and/or eliminating consumption of the hardware and/or software resources that would have otherwise been used to generate replacements for the first NFT. Further, this may add the capabilities of allowing selection between multiple versions of the asset, failure protection through redundancy via multiple copies of the asset, providing of self-executing web microservices, providing storage location flexibility, access control, and so on.

Described in another way, typically, a smart contract and a fixed URL (uniform resource locator) to a location (typically to a fixed location in IPFS) where the asset is stored (the payload) are embedded in each NFT. Because the URL is fixed, the asset cannot be moved. By way of contrast, the present disclosure embeds a portable (or intermediate) URL in the NFT that points to the address where the asset is stored. Because this URL is portable, the URL can be moved, the host of the directory service can be changed, and/or the asset may be moved (though these operations may be performed independently such that the URL may be moved without changing the host or moving the asset, the asset may be moved without moving the URL or changing the host, or the host may be changed without moving the asset or), without having to revoke the NFT and generate a new NFT. This may reduce system burdens, resource consumption, storage requirements, cost, and so on versus repeatedly revoking and re-creating large numbers of NFTs.

The smart contract may also be referenced by a portable URL in the NFT as opposed to embedding the smart contract in the NFT. Alternatively, multi-contract situations may also be enabled. A first smart contract and/or a first portion of a smart contract may be embedded in the NFT along with a portable URL to a second smart contract and/or a second portion of a smart contract. The first smart contract and/or the first portion of the smart contract may be may be parsed to control what effect the second smart contract and/or the second portion of the smart contract has, such as where anything in the second smart contract and/or the second portion of the smart contract is allowed as long as there is no conflict with the first smart contract and/or the first portion of the smart contract, the second smart contract and/or the second portion of the smart contract controls, the first smart contract and/or the first portion of the smart contract controls, and/or otherwise specified in the first smart contract and/or the first portion of the smart contract. The second smart contract and/or the second portion of the smart contract may not exist at the time that the NFT is minted. Instead, the portable URL may reference a null and the second smart contract and/or the second portion of the smart contract may only come into play if the portable URL is moved to point to the second smart contract and/or the second portion of the smart contract after creation of such. The first smart contract and/or the first portion of the smart contract may specify what is to occur if the portable URL points to a null.

In this way, the present disclosure may provide technological solutions to asset management for NFTs, particularly technological solutions that arise from the technological problems introduced by the unchangeable nature of NFTs. The system 100 may be able to provide improved user interfaces, eliminate delays introduced by asset inaccessibility, and/or perform various related functions that the system and/or device would not previously have been able to perform absent the technology disclosed herein. This may enable the system 100 to operate more efficiently while consuming fewer hardware and/or software resources as more resource consuming techniques may be omitted. Further, one or more databases and/or other components may be omitted while still enabling various functions and/or other functions, reducing unnecessary hardware and/or software components, and providing greater system flexibility and security.

In some examples, an NFT that is associated with an asset associated with an address may include a reference to that address that is tied to a unique domain name service entry that is assigned to a first party associated with a first platform. In such an example, the domain name service entry may be reassigned to a second party, allowing the asset to be portable if it is desired to move the asset to another platform. Various configurations are possible and contemplated without departing from the scope of the present disclosure.

In various examples, an NFT that is associated with an asset associated with an address may include a reference to that address that is encrypted. One or more decryption tokens, keys, passwords, and/or other mechanisms may be associated with the NFT and may be used to decrypt the reference in order to access the asset. For example, the NFT may be a first NFT and a second NFT may be usable to decrypt the reference in the first NFT. Alternatively and/or additionally, the address may be a physical address of the asset. Various configurations are possible and contemplated without departing from the scope of the present disclosure.

The host platform 101 may include one or more frontends 104 and/or one or more backend services 105. The frontend 104 may include one or more application programming interfaces or "APIs". Similarly, the backend services 105 may be accessed using one or more APIs. The frontend 104 may be usable by one or more issuer instances 102 to request creation of and/or performance of one or more transactions and/or other actions related to one or more NFTs 110, smart contracts 111, and/or minted documents 119. The frontend 104 may interact with one or more unsecure and/or secure storages 106 and/or one or more blockchains 107 to store one or more NFTs 110, smart contracts 111, minted documents 119, and so on. A directory service 108 may by usable by the host platform 101 to associate assets in the one more unsecure and/or secure storages 106 and/or one or more blockchains 107. The frontend 104 and/or the one or more blockchains 107 may be communicably connected to the backend services 105.

The issuer instance 102 may include one or more minters 112 that may include one or more user seats 113A-113N, a minting authority 114, an issuer 115, and so on. The issuer 115 may be verified and authenticated by the host platform 101, such as by communication over a verified connection, using multi-factor authentication (such as a login and/or password, a one-time password sent to a known email address and/or other communication address, one or more authenticator apps, and so on), and so on. The minting authority 114 and/or the issuer instance 102 may be communicably connected to the frontend 104.

The user platform 103 may include a user wallet 116 and a user 117. The user wallet 116 may be a token wallet. The user wallet 116 may store one or more private and/or public keys related to one or more NFTs. The user wallet 116 and/or the user platform 103 may be communicably connected to the one or more unsecure and/or secure storages 106, one or more blockchains 107, and/or backend services 105. The user 117 may be verified and authenticated by the host platform 101, such as by communication over a verified connection, using multi-factor authentication (such as a login and/or password, a one-time password sent to a known email address and/or other communication address, one or more authenticator apps, and so on) and so on.

Figure 1B:
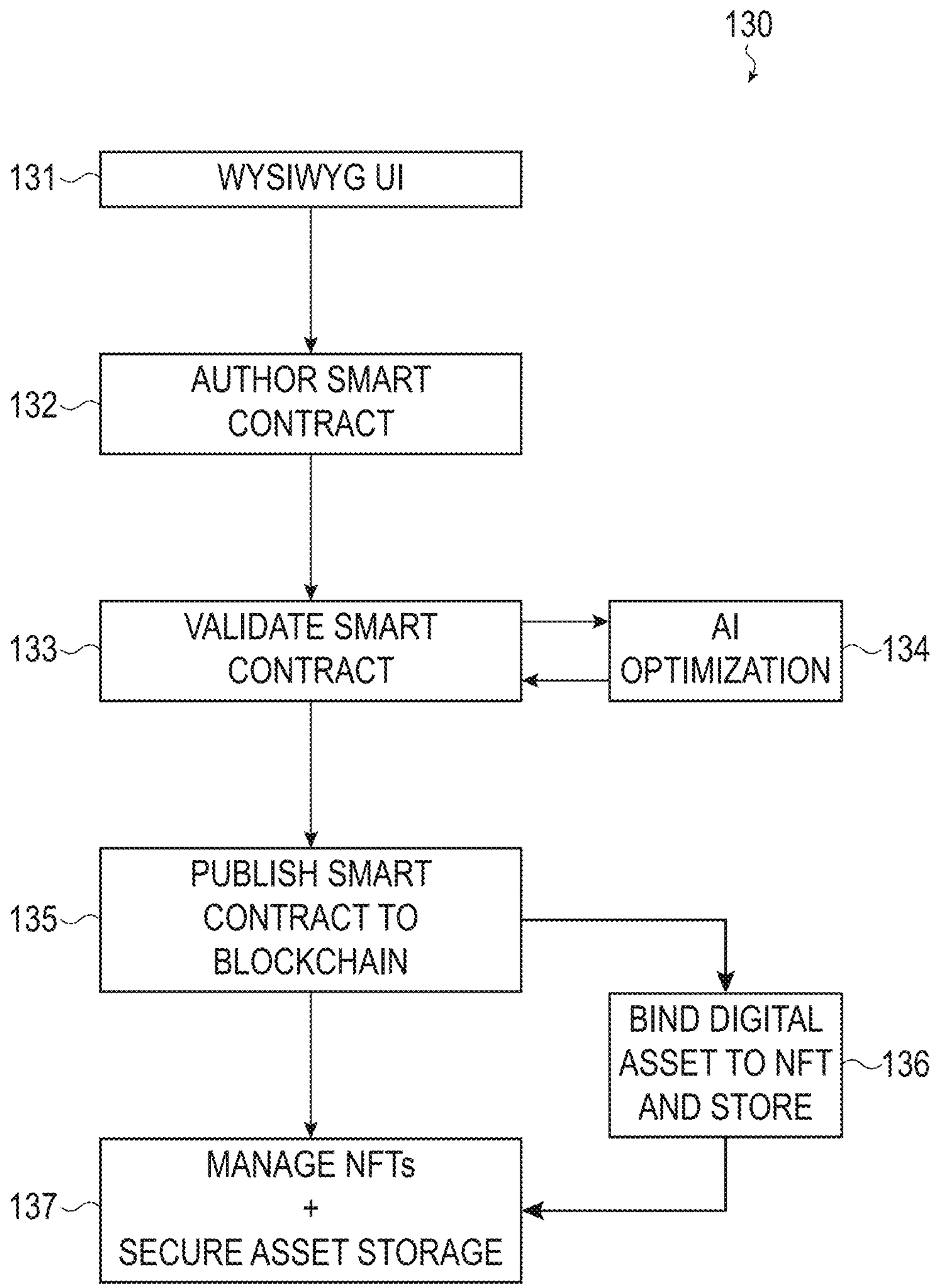
FIG. 1B depicts a flow of using creation and minting of a smart contract and a non-fungible token. The flow may be performed by the system of FIG. 1A.

FIG. 1B depicts a flow 130 of using creation and minting of a smart contract and non-fungible token. The flow may be performed by the system 100 of FIG. 1A. A what you see is what you get ("WYSIWYG") and/or other user interface 131 may be provided. The user interface 131 may be used to author one or more smart contracts 132. The authored smart contracts may be validated 133 and/or optimized using artificial intelligence (AI) 134. The validated and/or optimized smart contract (and/or any generated related one or more NFTs) may be published to one or more blockchains 135. A digital asset related to the smart contract may be bound to the one or more NFTs and stored 136. The one or more NFTs may then be managed and the digital asset may be securely and/or otherwise stored 137.

Although the flow 130 illustrates a particular flow, it is understood that this is an example. In other implementations, other flows of the same, similar, and/or different operations may be used. Various configurations are possible and contemplated without departing from the scope of the present disclosure.

Figure 1C:
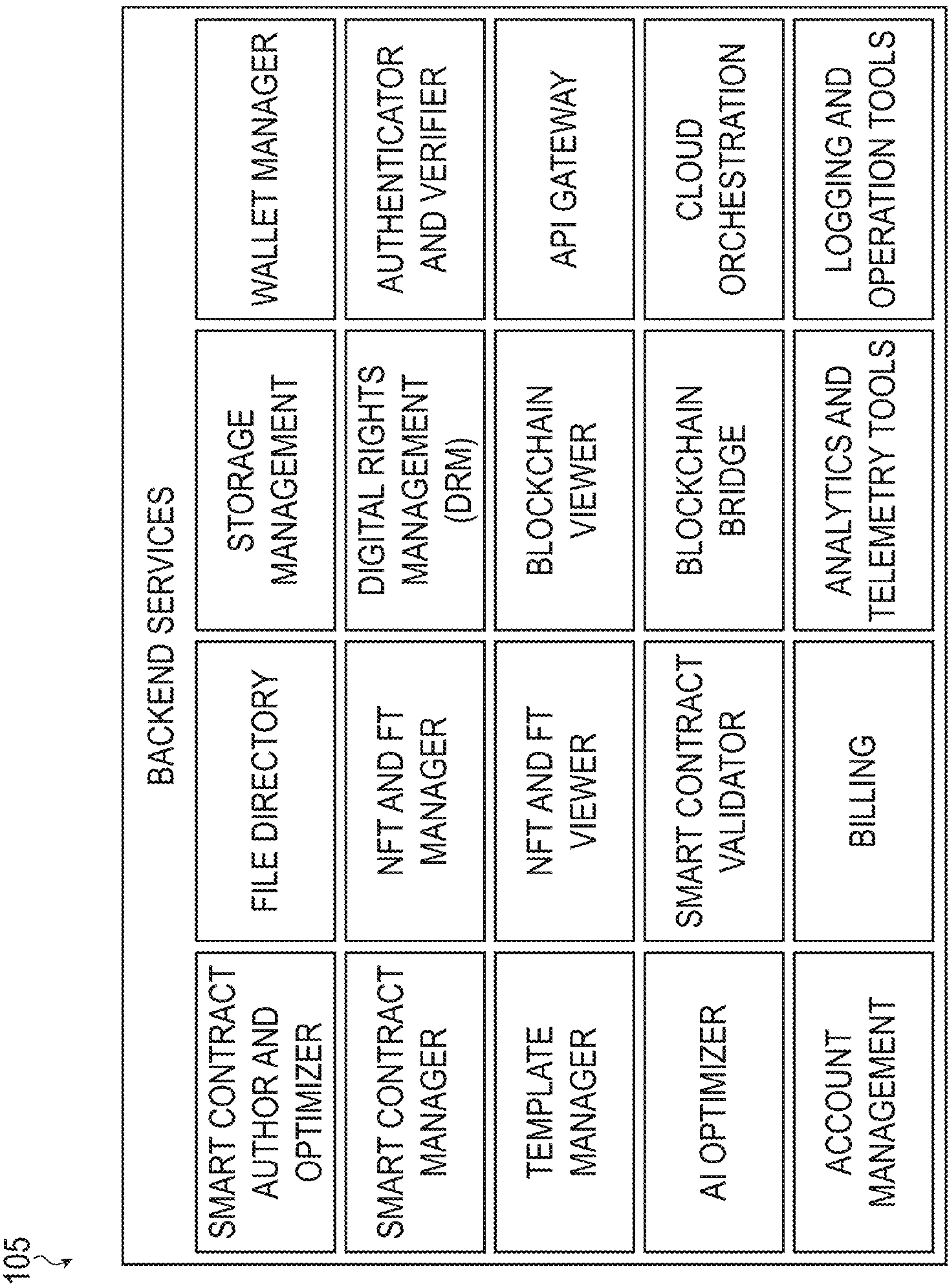
FIG. 1C depicts a list of backend services. The backend services may support and/or be provided by the system of FIG. 1A.

FIG. 1C depicts a list of backend services 105. The backend services 105 may support and/or be provided by the system 100 of FIG. 1A. The list may include one or more smart contract authors and/or optimizers, file directories, storage management, wallet managers, smart contract managers, NFT and FT managers, digital rights management (DRM), authenticators and/or verifiers, template managers, NFT and/or FT viewers, blockchain viewers, API gateways, AI optimizers, smart contract validators, blockchain bridges, cloud orchestration, account management, billing, analytics and/or telemetry tools, logging and operation tools, and so on.

Although the list illustrates examples of backend services 105, it is understood that this is an example. In other implementations, other backend services 105 may be used. Various configurations are possible and contemplated without departing from the scope of the present disclosure.

Figure 1D:
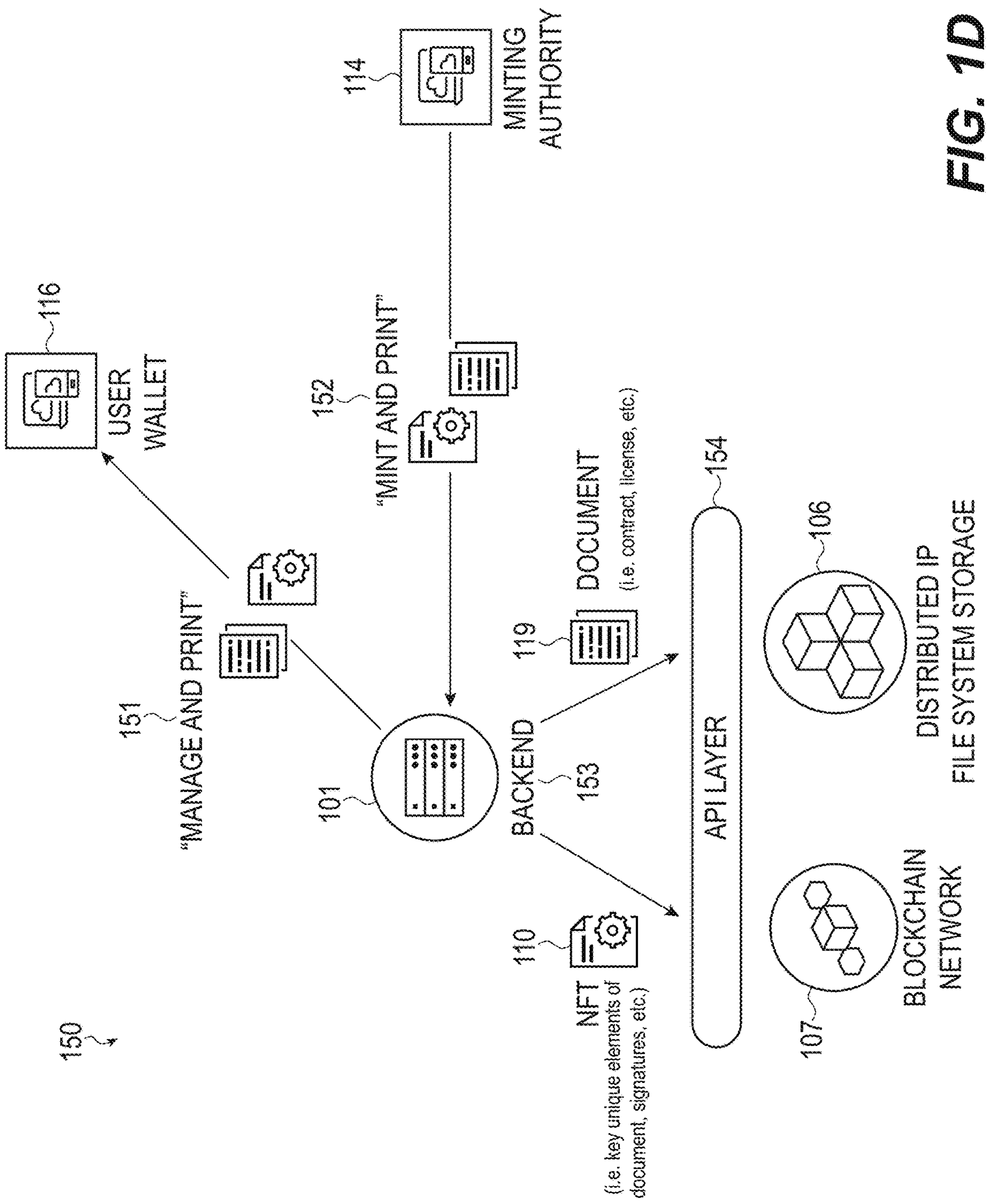
FIG. 1D depicts mint-print-manage functions. The mint-print-manage functions may be performed and/or supported and/or provided by the system of FIG. 1A.

FIG. 1D depicts mint-print-manage functions 150. The mint-print-manage functions 150 may be performed and/or supported and/or provided by the system 100 of FIG. 1A. As shown, a host platform 101 may communicate with a user wallet 116 and/or a minting authority 114 to perform manage and print functions 151 and/or mint and print functions 152. The host platform 101 may use a backend 153 and/or an API layer 154 to store one or more NFTs 110 (which may include key unique elements of one or more documents 119, signature, and so on) in one or more blockchain 107 networks and/or one or more documents 119 (such as one or more contracts, licenses, and so on) in a distributed internet protocol file system storage and/or other unsecure and/or secure storage 106.

Although the mint-print-manage functions 150 are illustrated and described with a particular configuration, it is understood that this is an example. In other implementations, other configurations of the same, similar, and/or different operations may be used. Various configurations are possible and contemplated without departing from the scope of the present disclosure.

Returning to FIG. 1A, although the system 100 is illustrated and described as including particular components arranged in a particular configuration, it is understood that this is an example. In a number of implementations, various configurations of various components may be used without departing from the scope of the present disclosure.

For example, the system 100 is illustrated and described as the user platform 103 including the user wallet 116. However, it is understood that this is an example. In various implementations, the system 100 may include a host platform 101 that automatically generates and/or maintains one or more local and/or cloud-based token wallets, such as token wallets associated with one or more communication addresses (such as one or more email addresses, telephone numbers, social media messaging addresses, and so on) of one or more users. This may increase the likelihood that users will use the system 100 as the users do not have to know how to create token wallets, as well as simplifying user interfaces and improving the operation of computing devices used to implement the system 100. Various configurations are possible and contemplated without departing from the scope of the present disclosure.

Figure 1E:
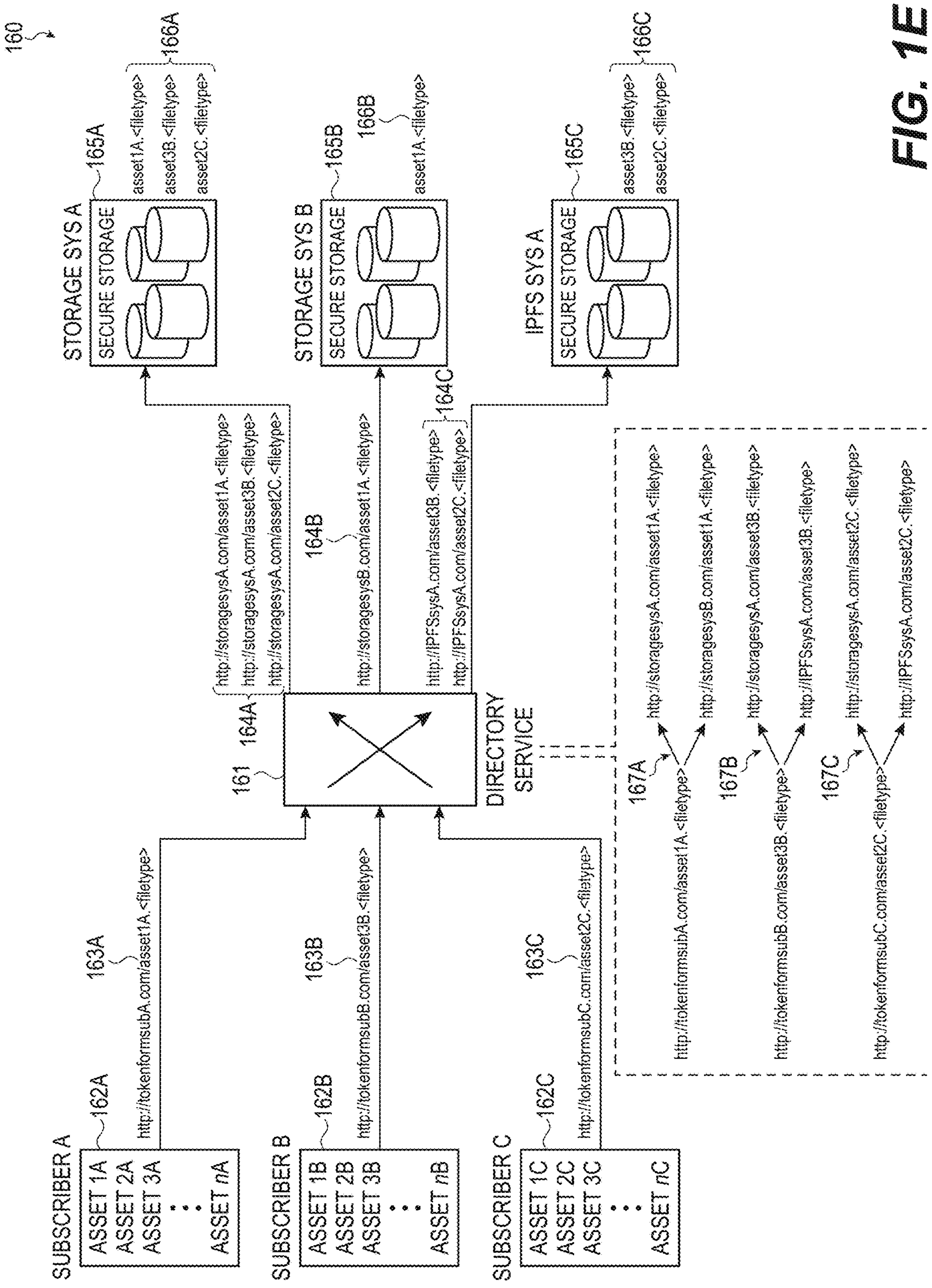
FIG. 1E depicts a directory service architecture for non-fungible tokens. Functions related to the directory service architecture may be performed and/or supported and/or provided by the system of FIG. 1A.

FIG. 1E depicts a directory service architecture 160 for non-fungible tokens.

Functions related to the directory service architecture may be performed and/or supported and/or provided by the system 100 of FIG. 1A, such as by the host platform 101 of FIG. 1A, one or more smart contracts associated with one or more NFTs generated by the host platform 101 of FIG. 1A, and so on.

The host platform 101 of FIG. 1A and/or a smart contract associated with an NFT generated by the host platform 101 of FIG. 1A may implement a directory service 161. The directory service 161 may associate one or more referenced assets 162A-162C associated with one or more subscribers and/or other entities referenced by one or more first addresses 163A-163C with one or more stored assets 166A-166C stored in one or more storage areas 165A-165C at one or more second addresses 164A-164C via one or more mappings 167A-167C. When the directory service 161 receives a request at one or more of the first addresses 163A-163C, the directory service may directly and/or indirectly route the request to the one or more second addresses 164A-164C. The directory service 161 may also manage encryption and/or decryption of one or more of the stored assets 166A-166C, such as in response to one or more requests for the stored assets 166A-166C that the directory service 161 determines are authorized.

The storage may be internal, be external, be encrypted, be unencrypted, be IPFS (InterPlanetary File System) storages, and so on. The mappings 167A-167C and/or the second addresses 164A-164C may be changed. The mappings 167A-167C may point to multiple versions of the stored assets 166A-166C, such as redundant copies, copies stored in different storage areas 165A-165C, copies with different levels (such as none, some, all, and so on) of redaction and/or encryption, and so on.

The directory service 161 may maintain individual domains for the one or more subscribers and/or other entities and may maintain and/or manage assets for the one or more subscribers and/or other entities within those individual domains. These individual domains may later be transferred, such as by the directory service 161, by changing the domain name registration of the domain, and so on.

Figure 2:
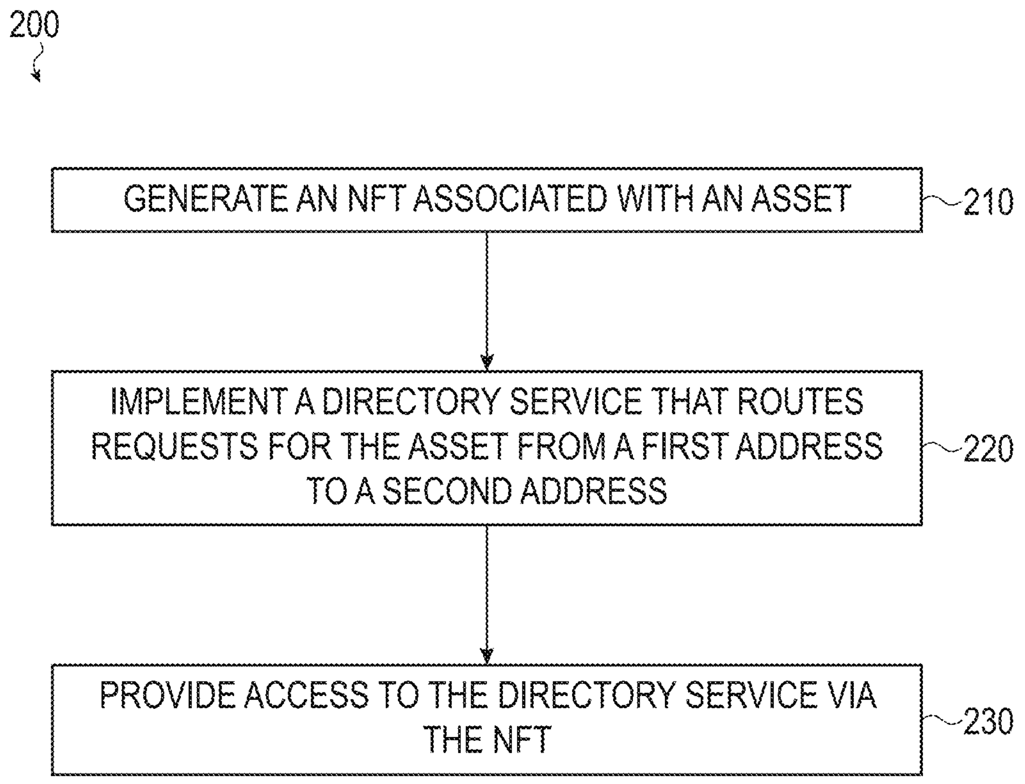
FIG. 2 depicts a flow chart illustrating a first example method related to directory services for one or more non-fungible tokens. This method may be performed by the system of FIG. 1A.

FIG. 2 depicts a flow chart illustrating a first example method 200 related to directory services for one or more non-fungible tokens. This method may be performed by the system 100 of FIG. 1A.

At operation 210, an electronic device (such as one or more computing devices associated with the host platform 101 of FIG. 1A, the issuer instance 102 of FIG. 1A, the user platform 103 of FIG. 1A, and/or another device or system) may generate an NFT associated with an asset. The NFT may be subsequently unchangeable. The NFT may include a reference to the address at a first address.

At operation 220, the electronic device may implement a directory service that routes requests for the asset from the first address to a second address. The directory service may be implemented by the electronic device and/or one or more smart contracts of one or more other NFTs generated by the electronic device.

At operation 230, the electronic device may provide access to the directory service via the NFT. For example, the electronic device may receive communications for the directory service, provide one or more NFTs associated with one or more smart contracts that implement the directory service, and so on.

In various examples, this example method 200 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as providing access to the directory service. However, it is understood that this is an example. In some implementations, different computing devices may generate the NFT, implement the directory service, and/or provide access to the directory service. Various configurations are possible and contemplated without departing from the scope of the present disclosure.

Figure 3:
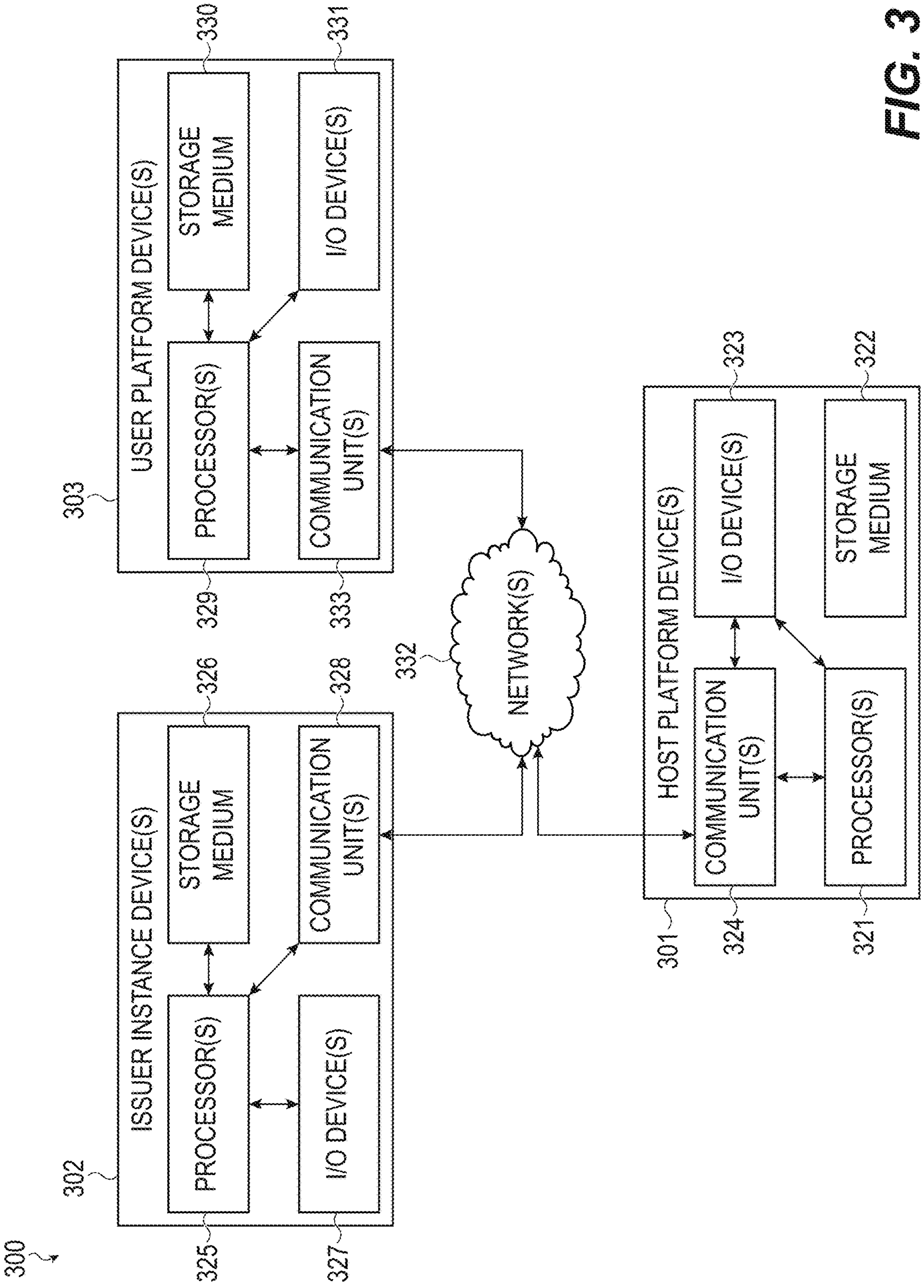
FIG. 3 depicts example relationships among example components that may be used to implement the system of FIG. 1A.

FIG. 3 depicts example relationships 300 among example components that may be used to implement the system 100 of FIG. 1A.

The host platform 101 of FIG. 1 may be implemented using one or more host platform devices 301. The host platform device 301 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The host platform device 301 may include one or more processors 321 and/or other processing units and/or controllers, one or more non-transitory storage media 322 (which may take the form of, but is not limited to, a magnetic storage medium; optical storage medium; magneto-optical storage medium; read only memory; random access memory; erasable programmable memory; flash memory; and so on), one or more communication units 324 (such as one or more network adapters and/or other devices used by a device to communicate with one or more other devices), one or more input and/or output components 323 (such as one or more displays, speakers, touch screens, computer mice, track pads, keyboards, printers, and so on) and/or one or more other components. The processor 321 may execute instructions stored in the non-transitory storage medium 322 to perform various functions. Such functions may include any of the functions discussed herein with respect to the host platform 101 of FIG. 1A; communicating with one or more issuer instance devices 302, user platform devices 303, and/or one or more other devices via one or more wired and/or wireless networks 332; and so on. Alternatively and/or additionally, the host platform device 301 may involve one or more memory allocations configured to store at least one executable asset and one or more processor allocations configured to access the one or more memory allocations and execute the at least one executable asset to instantiate one or more processes and/or services, such as one or more host platform services, and so on.

Similarly, the issuer instance 102 of FIG. 1A may be implemented using one or more issuer instance devices 302. The issuer instance device 302 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The issuer instance device 302 may include one or more processors 325 and/or other processing units and/or controllers, one or more non-transitory storage media 326 (which may take the form of, but is not limited to, a magnetic storage medium; optical storage medium; magneto-optical storage medium; read only memory; random access memory; erasable programmable memory; flash memory; and so on), one or more communication units 328 (such as one or more network adapters and/or other devices used by a device to communicate with one or more other devices), one or more input and/or output components 327 (such as one or more displays, speakers, touch screens, computer mice, track pads, keyboards, printers, and so on) and/or one or more other components. The processor 325 may execute instructions stored in the non-transitory storage medium 326 to perform various functions. Such functions may include any of the functions discussed herein with respect to the issuer instance 102 of FIG. 1A; communicating with one or more host platform devices 301, user platform devices 303, and/or one or more other devices via one or more wired and/or wireless networks 332; and so on. Alternatively and/or additionally, the issuer instance device 302 may involve one or more memory allocations configured to store at least one executable asset and one or more processor allocations configured to access the one or more memory allocations and execute the at least one executable asset to instantiate one or more processes and/or services, such as one or more issuer instance services, and so on.

Likewise, the user platform 103 of FIG. 1A may be implemented using one or more user platform devices 303. The user platform device 303 may be any kind of electronic device. Examples of such devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The user platform device 303 may include one or more processors 329 and/or other processing units and/or controllers, one or more non-transitory storage media 330 (which may take the form of, but is not limited to, a magnetic storage medium; optical storage medium; magneto-optical storage medium; read only memory; random access memory; erasable programmable memory; flash memory; and so on), one or more communication units 333 (such as one or more network adapters and/or other devices used by a device to communicate with one or more other devices), one or more input and/or output components 331 (such as one or more displays, speakers, touch screens, computer mice, track pads, keyboards, printers, and so on) and/or one or more other components. The processor 329 may execute instructions stored in the non-transitory storage medium 330 to perform various functions. Such functions may include any of the functions discussed herein with respect to the user platform 103 of FIG. 1A; communicating with one or more issuer instance devices 302, host platform devices 301, and/or one or more other devices via one or more wired and/or wireless networks 332; and so on. Alternatively and/or additionally, the user platform device 303 may involve one or more memory allocations configured to store at least one executable asset and one or more processor allocations configured to access the one or more memory allocations and execute the at least one executable asset to instantiate one or more processes and/or services, such as one or more user platform services, and so on.

Additionally, FIG. 1A may involve one or more other devices not shown. Such other devices may be any kind of electronic device. Examples of such other devices include, but are not limited to, one or more desktop computing devices, laptop computing devices, server computing devices, mobile computing devices, tablet computing devices, set top boxes, digital video recorders, televisions, displays, wearable devices, smart phones, digital media players, and so on. The other devices may include one or more processors and/or other processing units and/or controllers, one or more non-transitory storage media (which may take the form of, but is not limited to, a magnetic storage medium; optical storage medium; magneto-optical storage medium; read only memory; random access memory; erasable programmable memory; flash memory; and so on), one or more communication units (such as one or more network adapters and/or other devices used by a device to communicate with one or more other devices), one or more input and/or output components (such as one or more displays, speakers, touch screens, computer mice, track pads, keyboards, printers, and so on) and/or one or more other components. The processor may execute instructions stored in the non-transitory storage medium to perform various functions. Such functions may include any of the functions discussed herein; communicating with one or more issuer instance devices 302, user platform devices 303, host platform devices 301, and/or one or more other devices via one or more wired and/or wireless networks 332; and so on. Alternatively and/or additionally, the other devices may involve one or more memory allocations configured to store at least one executable asset and one or more processor allocations configured to access the one or more memory allocations and execute the at least one executable asset to instantiate one or more processes and/or services, such as one or more other device services, and so on.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices, and so on); and so on. It may be appreciated that the foregoing examples are not exhaustive.

Example information can include, but may not be limited to: personal identification information (e.g., names, social security numbers, telephone numbers, email addresses, physical addresses, driver's license information, passport numbers, and so on); identity documents (e.g., driver's licenses, passports, government identification cards or credentials, and so on); protected health information (e.g., medical records, dental records, and so on); financial, banking, credit, or debt information; third-party service account information (e.g., usernames, passwords, social media handles, and so on); encrypted or unencrypted files; database files; network connection logs; shell history; file system files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first- or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Figure 4:
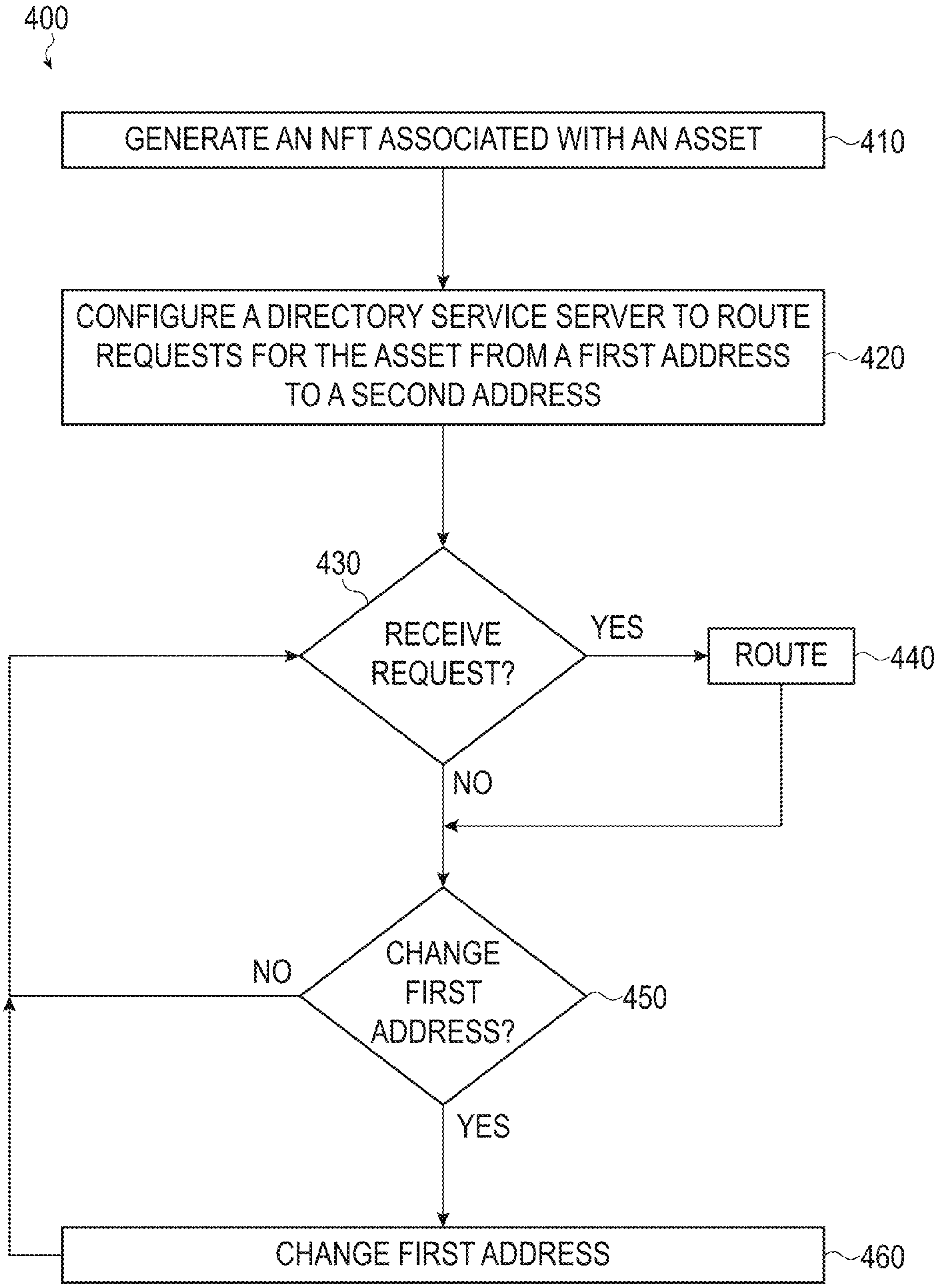
FIG. 4 depicts a flow chart illustrating a second example method related to directory services for one or more non-fungible tokens. This method may be performed by the system of FIG. 1A.

FIG. 4 depicts a flow chart illustrating a second example method 400 related to directory services for one or more non-fungible tokens. This method 400 may be performed by the system 100 of FIG. 1A.

At operation 410, an electronic device (such as one or more computing devices associated with the host platform 101 of FIG. 1A, the issuer instance 102 of FIG. 1A, the user platform 103 of FIG. 1A, and/or another device or system) may generate an NFT associated with an asset. For example, the NFT may be a virtual driver's license and the asset may be one or more files that provide information indicating whether or not the virtual driver's license is valid.

At operation 420, the electronic device may configure a directory service server to route requests for the asset from a first address to a second address. The directory service server may be the host platform 101 of FIG. 1A and/or any computing device.

At operation 430, the electronic device may determine whether or not a request for the asset is received at the first address. If so, the flow may proceed to operation 440 where the electronic device may route the request from the first address to the second address before the flow proceeds to operation 450. Otherwise, the flow may proceed directly to operation 450.

At operation 450, the electronic device may determine whether or not to change the first address. The electronic device may determine to change the first address when an authorized request to change the first address is received. Authorization may be determined using one or more passwords, NFTs, and/or other credentials. If so, the flow may proceed to operation 460 where the electronic device may change the first address before the flow returns to operation 430 and the electronic device again determines whether or not a request for the asset is received at the first address. Otherwise, the flow may directly return to operation 430.

In various examples, this example method 400 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 illustrates and describes determining whether or not to change the address after determining whether or not a request is received. However, it is understood that this is an example. In various implementations, the order of these operations may be reversed. Various configurations are possible and contemplated without departing from the scope of the present disclosure.

Figure 5:
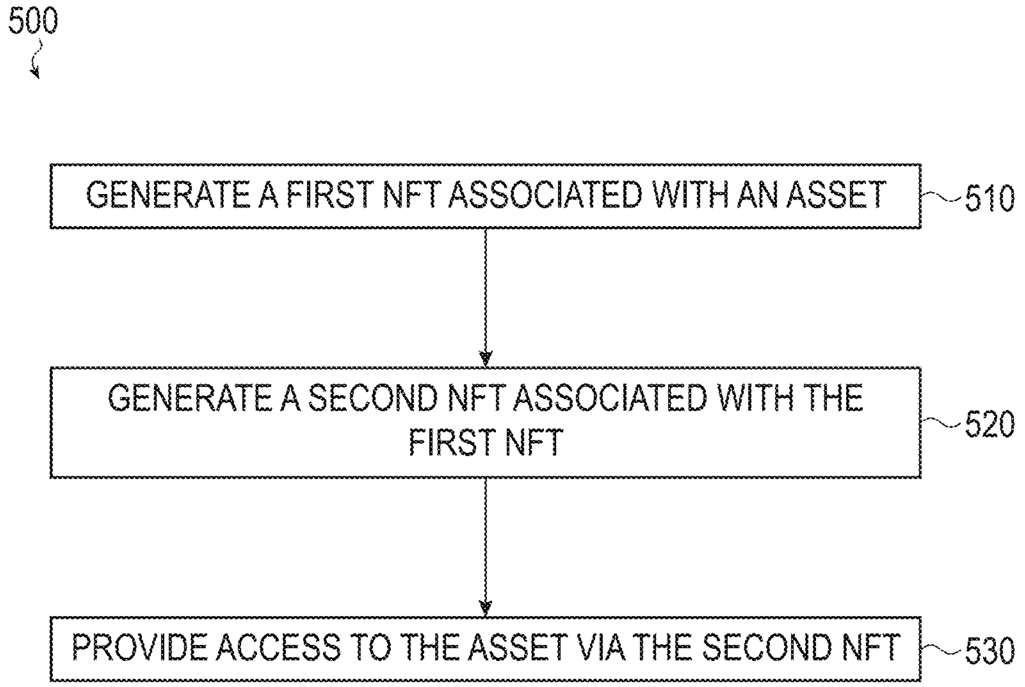
FIG. 5 depicts a flow chart illustrating a third example method related to directory services for one or more non-fungible tokens. This method may be performed by the system of FIG. 1A.

FIG. 5 depicts a flow chart illustrating a third example method 500 related to directory services for one or more non-fungible tokens. This method 500 may be performed by the system 100 of FIG. 1A.

At operation 510, an electronic device (such as one or more computing devices associated with the host platform 101 of FIG. 1A, the issuer instance 102 of FIG. 1A, the user platform 103 of FIG. 1A, and/or another device or system) may generate a first NFT associated with an asset. For example, the asset may be located at an address specified in a smart contract associated with the asset. At operation 520, the electronic device may generate a second NFT associated with the first NFT. At operation 530, the electronic device may provide access to the asset via the second NFT.

For example, the electronic device may provide the second NFT. The second NFT may be used to access the first NFT. A smart contract associated with the first NFT may redirect the access to the asset. Further, the smart contract may specify who may modify the reference in the smart contract to the asset and/or under what circumstances the reference in the smart contract to the asset may be modified.

In this way, the first NFT may implement a self-executing web microservice. Although this self-executing web microservice is illustrated and described as performing directory service functions, it is understood that this is an example. In a number of implementations, one or more NFTs may be used to implement any kind of self-executing web microservices. Various configurations are possible and contemplated without departing from the scope of the present disclosure.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 illustrates and describes the first NFT being associated with the asset. However, it is understood that this is an example. In various implementations, the asset may be referenced by the smart contract associated with the first NFT and the first NFT may not itself be directly associated with the asset. Various configurations are possible and contemplated without departing from the scope of the present disclosure.

Figure 6:
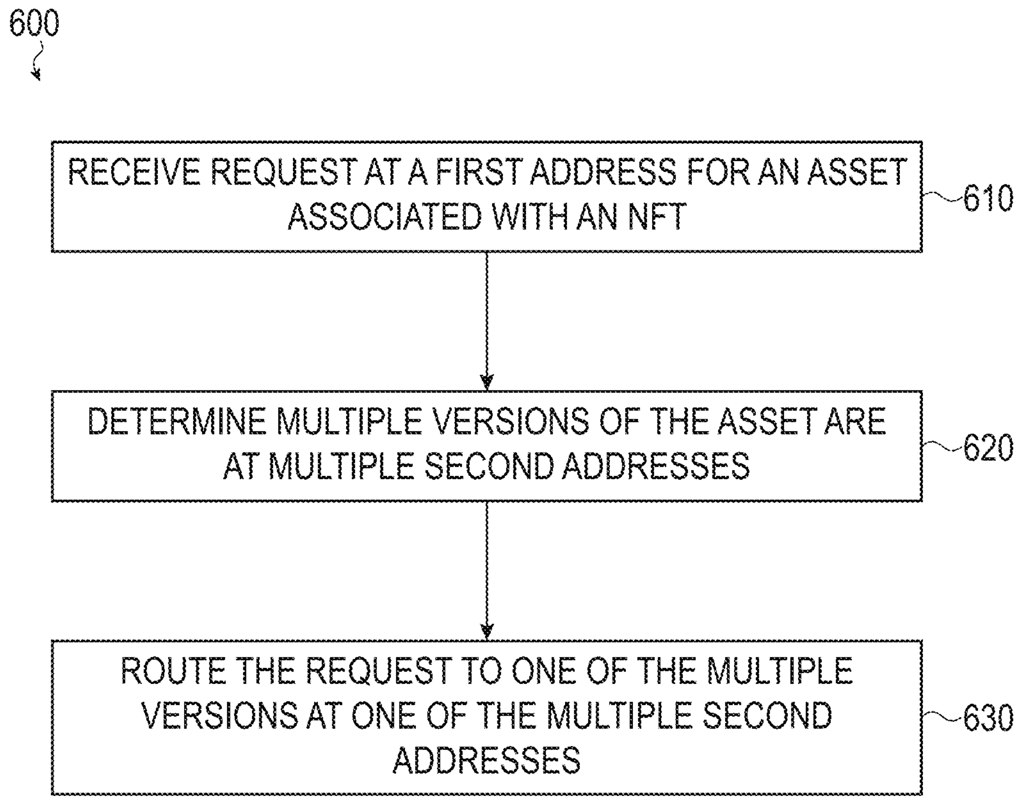
FIG. 6 depicts a flow chart illustrating a fourth example method related to directory services for one or more non-fungible tokens. This method may be performed by the system of FIG. 1A.

FIG. 6 depicts a flow chart illustrating a fourth example method 600 related to directory services for one or more non-fungible tokens. This method 600 may be performed by the system 100 of FIG. 1A.

At operation 610, an electronic device (such as one or more computing devices associated with the host platform 101 of FIG. 1A, the issuer instance 102 of FIG. 1A, the user platform 103 of FIG. 1A, and/or another device or system) may receive a request at a first address for an asset associated with an NFT. At operation 620, the electronic device may determine that multiple versions of the asset are at multiple second addresses. At operation 630, the electronic device may route the request to one of the multiple versions at one of the multiple second addresses.

For example, the multiple versions of the asset may be identical copies. In such an example, redundancy and/or load balancing may be provided to route to the most quickly accessed copy, any accessible copy, the most efficiently accessed copy, a lower cost copy, and so on.

By way of another example, the multiple versions may be different levels of redaction and/or encryption of the asset (including no redaction or encryption, some level of redaction or encryption, fully redacted or encrypted, and so on). In such an example, the electronic device may determine which level of redaction and/or encryption the requestor is authorized to access (such as by using one or more passwords, authorization NFTs, and/or other credentials) and routing accordingly.

By way of illustration, an asset may correspond to driver's license information and a first authorization level may include no encryption or redaction whereas a second authorization level may encrypt or redact all driver's license information not necessary to evidence that the driver's license is valid. The second authorization level may then be provided upon request to evidence validity of the driver's license without exposing unnecessary sensitive information.

In various examples, this example method 600 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 illustrates and describes determining that multiple versions of the asset are at multiple second addresses. However, it is understood that this is an example. In various implementations, the electronic device may route the request to one of the multiple versions without first performing a determination that there are multiple versions. Various configurations are possible and contemplated without departing from the scope of the present disclosure.

Figure 7:
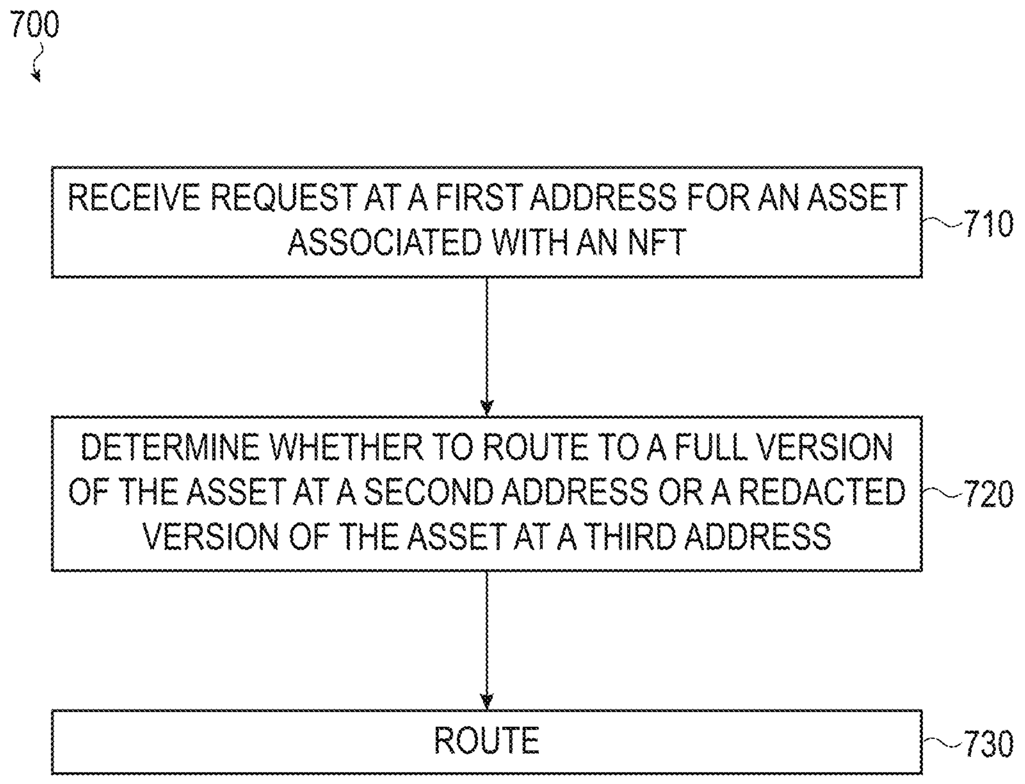
FIG. 7 depicts a flow chart illustrating a fifth example method related to directory services for one or more non-fungible tokens. This method may be performed by the system of FIG. 1A.

FIG. 7 depicts a flow chart illustrating a fifth example method 700 related to directory services for one or more non-fungible tokens. This method 700 may be performed by the system 100 of FIG. 1A.

At operation 710, an electronic device (such as one or more computing devices associated with the host platform 101 of FIG. 1A, the issuer instance 102 of FIG. 1A, the user platform 103 of FIG. 1A, and/or another device or system) may receive a request at a first address for an asset associated with an NFT. At operation 720, the electronic device may determine whether to route to a full version of the asset at a second address or a redacted version of the asset at a third address. At operation 730, the electronic device may route.

For example, the determination may be made based upon the NFT. Multiple NFTs may be used to request the same asset. The full version may be accessible using one of the multiple NFTs and the redacted version may be accessible via another of the multiple NFTs. Various configurations are possible and contemplated without departing from the scope of the present disclosure.

By way of another example, the determination may be made based upon an authorization level associated with the requestor. The requestor may evidence their authorization level using a password, an authorization NFT, and/or other credentials. Various configurations are possible and contemplated without departing from the scope of the present disclosure.

In various examples, this example method 700 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 illustrates and describes a full version of the asset and a redacted version. However, it is understood that this is an example. In various implementations, there may be multiple redacted versions, with or without different levels of redaction. Additionally and/or alternatively, one or more versions of the asset may include one or more levels of encryption. Various configurations are possible and contemplated without departing from the scope of the present disclosure.

Figure 8:
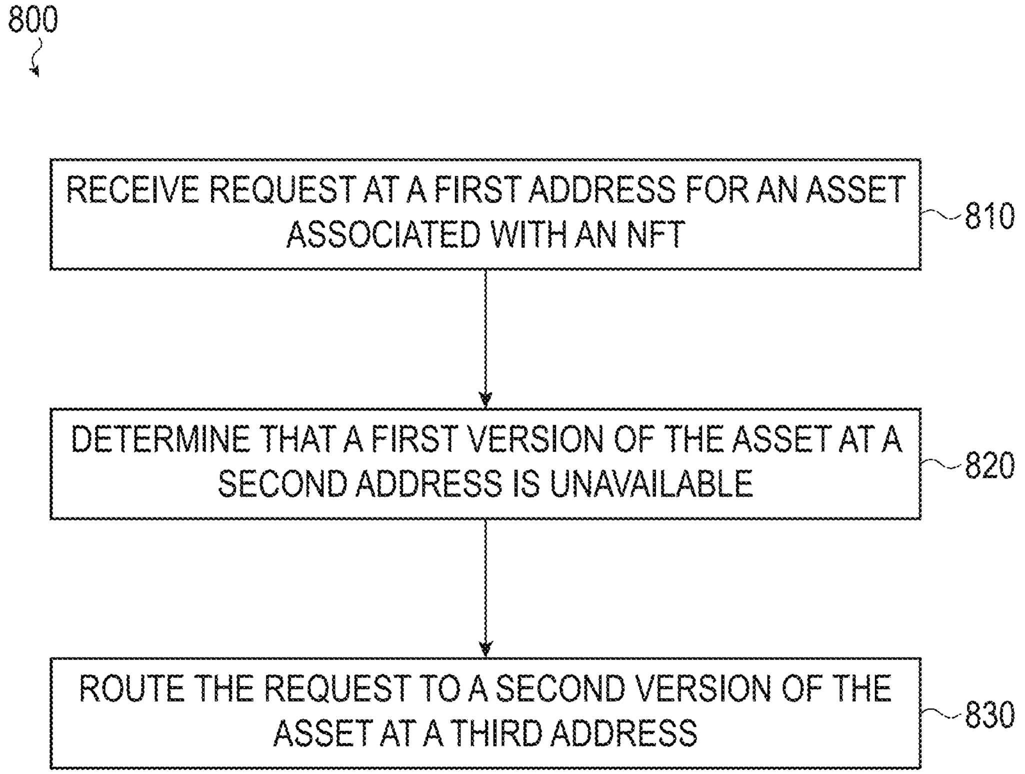
FIG. 8 depicts a flow chart illustrating a sixth example method related to directory services for one or more non-fungible tokens. This method may be performed by the system of FIG. 1A.

FIG. 8 depicts a flow chart illustrating a sixth example method 800 related to directory services for one or more non-fungible tokens. This method 800 may be performed by the system 100 of FIG. 1A.

At operation 810, an electronic device (such as one or more computing devices associated with the host platform 101 of FIG. 1A, the issuer instance 102 of FIG. 1A, the user platform 103 of FIG. 1A, and/or another device or system) may receive a request at a first address for an asset associated with an NFT. At operation 820, the electronic device may determine that a first version of the asset at a second address is unavailable. At operation 830, the electronic device may route the request to a second version of the asset at a third address.

For example, the first version of the asset may be unavailable because the storage area where the first asset is stored may be overburdened or down. As such, providing the second version of the asset, which may be stored at another storage area, may provide redundancy and fault tolerance. Various configurations are possible and contemplated without departing from the scope of the present disclosure.

By way of another example, the first version of the asset may be unavailable because the requestor does not have authorization to access the storage area where the first asset is stored. This may be mitigated by providing the second version of the asset, which may be stored at a storage area that the requestor does have authorization to access. Various configurations are possible and contemplated without departing from the scope of the present disclosure.

In various examples, this example method 800 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 illustrates and describes determining that the first version of the asset is unavailable. However, it is understood that this is an example. In various implementations, the electronic device may provide access to the second version of the asset instead of the first version of the asset for reasons other than the first version of the asset being unavailable, such as to balance the load of access between the first version of the asset and the second version of the asset. Various configurations are possible and contemplated without departing from the scope of the present disclosure.

Figure 9:
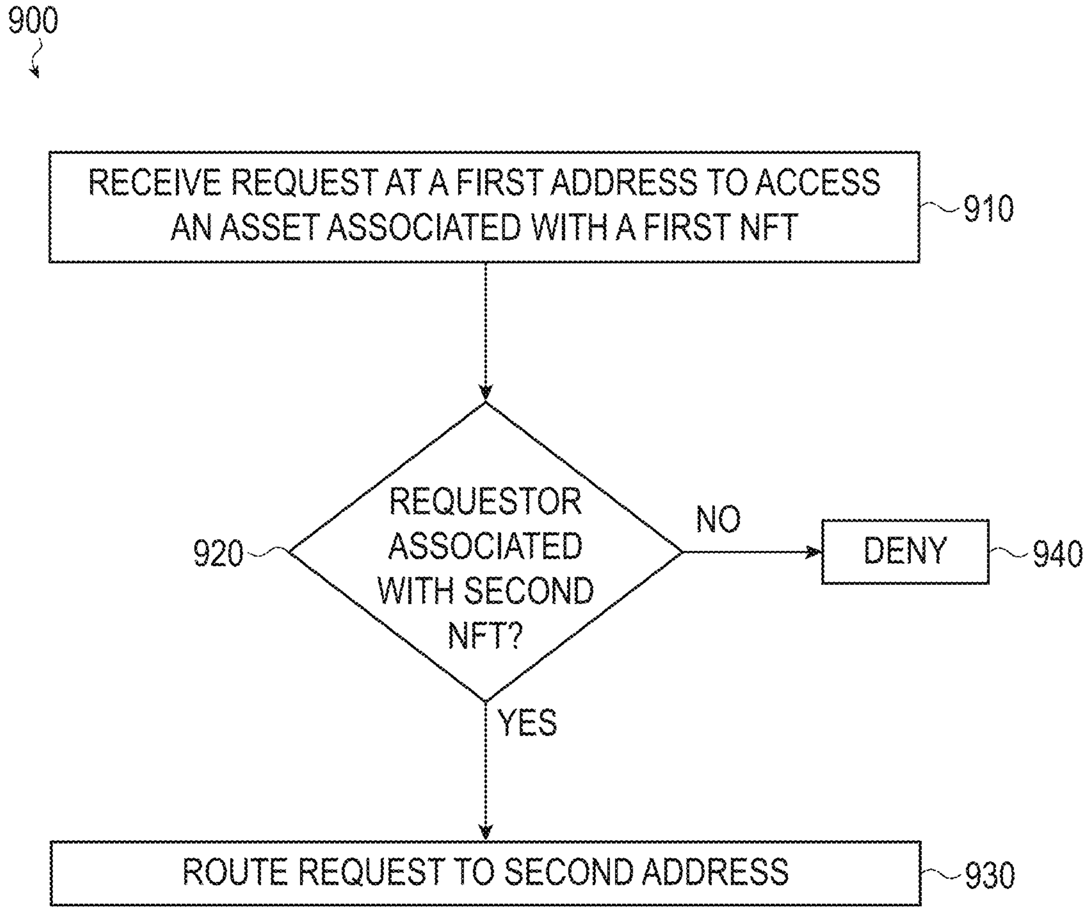
FIG. 9 depicts a flow chart illustrating a seventh example method related to directory services for one or more non-fungible tokens. This method may be performed by the system of FIG. 1A.

FIG. 9 depicts a flow chart illustrating a seventh example method 900 related to directory services for one or more non-fungible tokens. This method 900 may be performed by the system 100 of FIG. 1A.

At operation 910, an electronic device (such as one or more computing devices associated with the host platform 101 of FIG. 1A, the issuer instance 102 of FIG. 1A, the user platform 103 of FIG. 1A, and/or another device or system) may receive a request at a first address to access an asset associated with a first NFT. At operation 920, the electronic device may determine whether or not the requestor is associated with a second NFT. If so, the flow may proceed to operation 930 where the electronic device may route the request to a second address. Otherwise, the flow may proceed to operation 940 where the electronic device may deny the request.

For example, the second NFT may be an NFT that provides authorization to access the asset. The electronic device may determine that the requestor is associated with the second NFT by determining that the second NFT is associated with a local and/or cloud-based wallet that is associated with the requestor. Various configurations are possible and contemplated without departing from the scope of the present disclosure.

In various examples, this example method 900 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 illustrates and describes determining whether or not the requestor is associated with the second NFT. However, it is understood that this is an example. In various implementations, the electronic device may prompt the requestor for the second NFT and/or other authorization credentials. Various configurations are possible and contemplated without departing from the scope of the present disclosure.

Figure 10:
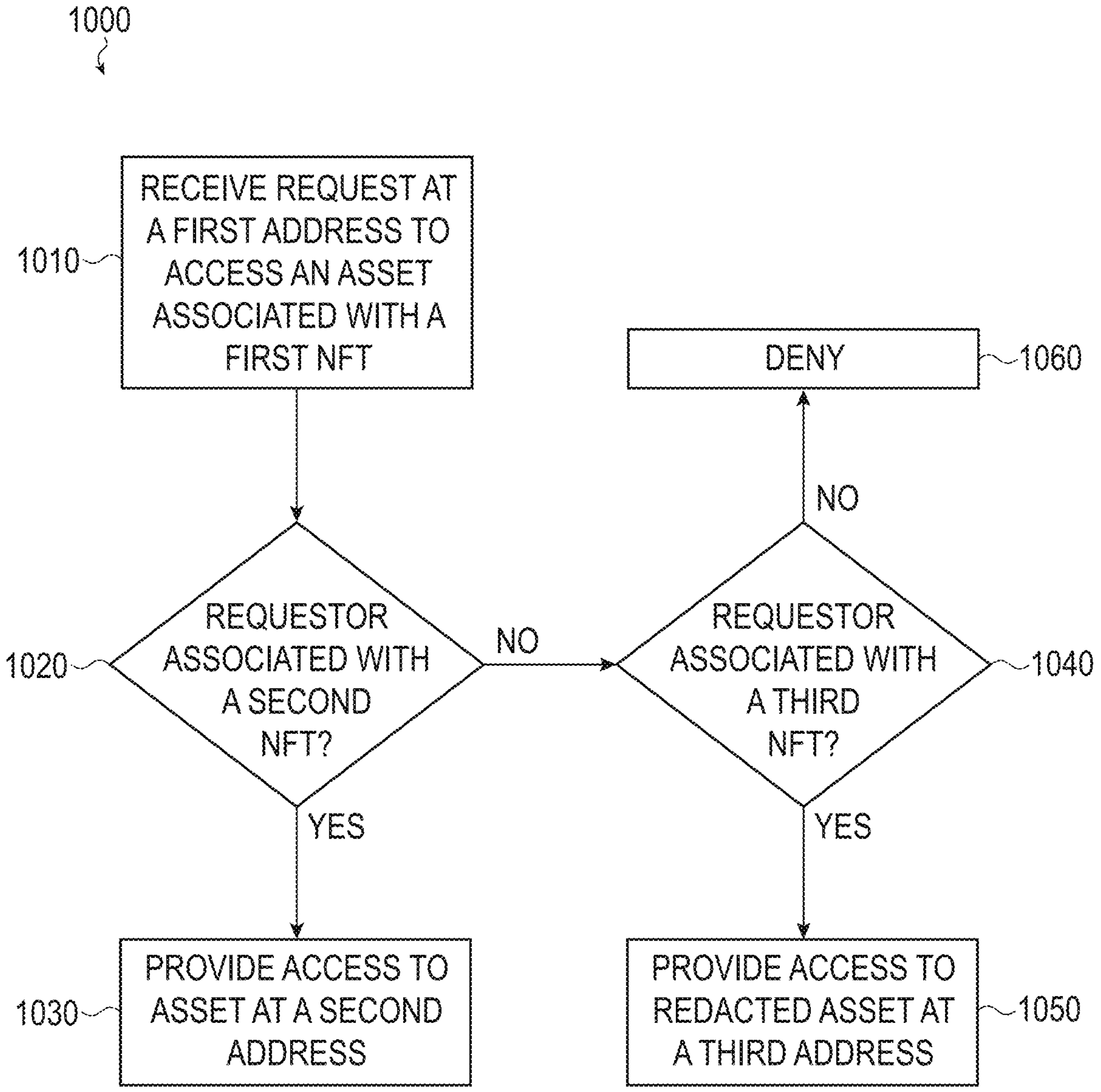
FIG. 10 depicts a flow chart illustrating an eighth example method related to directory services for one or more non-fungible tokens. This method may be performed by the system of FIG. 1A.

FIG. 10 depicts a flow chart illustrating an eighth example method 1000 related to directory services for one or more non-fungible tokens. This method 1000 may be performed by the system 100 of FIG. 1A.

At operation 1010, an electronic device (such as one or more computing devices associated with the host platform 101 of FIG. 1A, the issuer instance 102 of FIG. 1A, the user platform 103 of FIG. 1A, and/or another device or system) may receive a request at a first address to access an asset associated with a first NFT. At operation 1020, the electronic device may determine whether the requestor is associated with a second NFT. If so, the flow may proceed to operation 1030 where the electronic device may provide access to the asset at a second address. Otherwise, the flow may proceed to operation 1040.

At operation 1040, the electronic device may determine whether or not the requestor is associated with a third NFT. If so, the flow may proceed to operation 1050 where the electronic device may provide access to a redacted asset at a third address. Otherwise, the flow may proceed to operation 1060 where the electronic device may deny access to all versions of the asset.

In various examples, this example method 1000 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 illustrates and describes the electronic device determining authorization to access the asset or the redacted asset using a second NFT or a third NFT. However, it is understood that this is an example. In various implementations, other authorization credentials may be used, such as one or more passwords. Various configurations are possible and contemplated without departing from the scope of the present disclosure.

Figure 11:
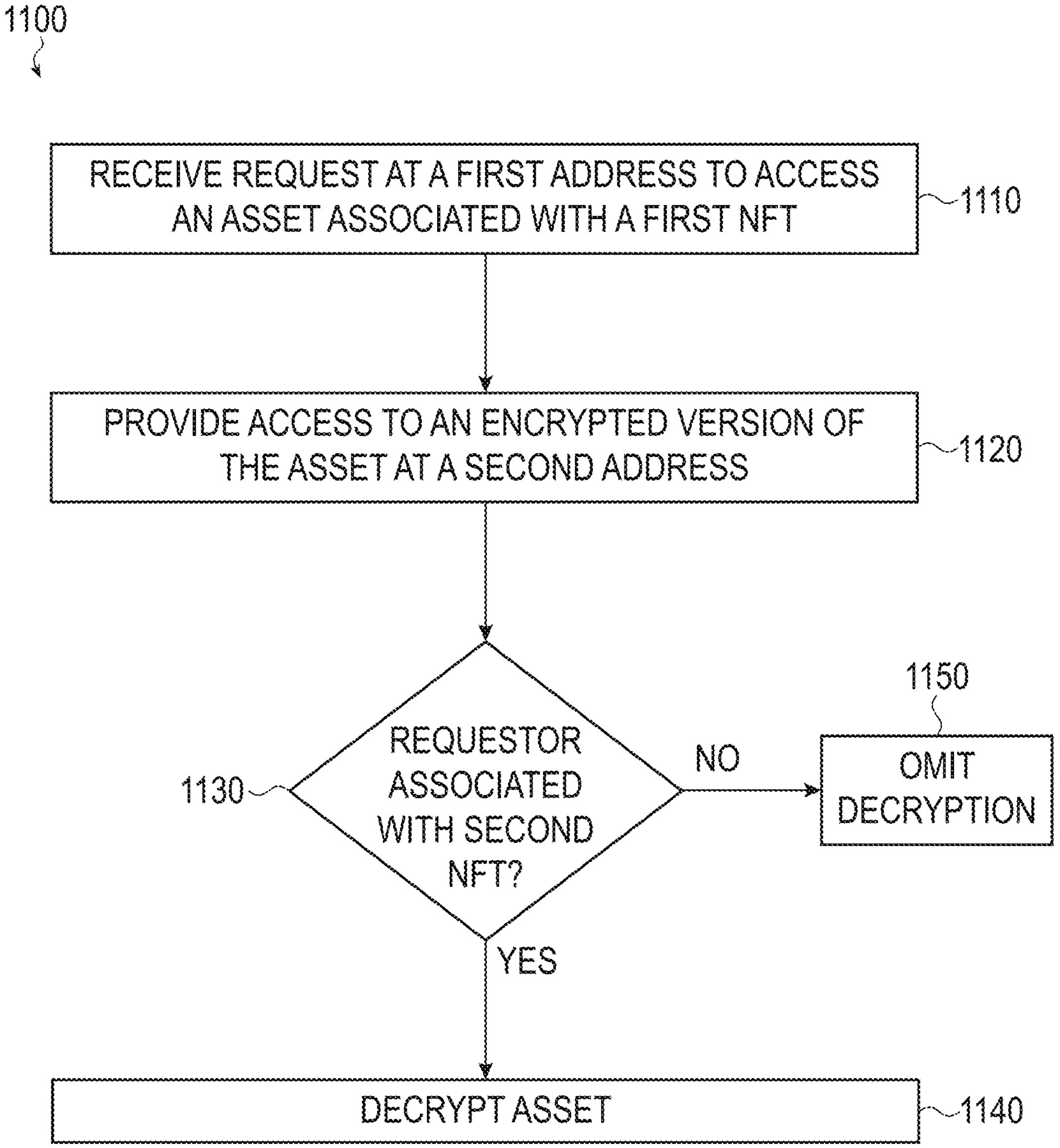
FIG. 11 depicts a flow chart illustrating a ninth example method related to directory services for one or more non-fungible tokens. This method may be performed by the system of FIG. 1A.

FIG. 11 depicts a flow chart illustrating a ninth example method 1100 related to directory services for one or more non-fungible tokens. This method 1100 may be performed by the system 100 of FIG. 1A.

At operation 1110, an electronic device (such as one or more computing devices associated with the host platform 101 of FIG. 1A, the issuer instance 102 of FIG. 1A, the user platform 103 of FIG. 1A, and/or another device or system) may receive a request at a first address to access an asset associated with a first NFT. At operation 1120, the electronic device may provide access to an encrypted version of the asset at a second address.

At operation 1130, the electronic device may determine whether or not the requestor is associated with second NFT. If so, the flow may proceed to operation 1140 where the electronic device may decrypt the asset. Otherwise, the flow may proceed to operation 1150 where the electronic device may omit decryption.

In various examples, this example method 1100 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1100 is illustrated and described as including particular operations performed in a particular order, it is understood that this is an example. In various implementations, various orders of the same, similar, and/or different operations may be performed without departing from the scope of the present disclosure.

For example, the method 1100 illustrates and describes providing an encrypted version of the asset and decrypting if the requestor is authorized. However, it is understood that this is an example. In various implementations, the electronic device may determine authorization before providing even the encrypted version of the asset, and/or may be capable of decrypting one or more different encrypted portions of the asset. Various configurations are possible and contemplated without departing from the scope of the present disclosure.

Figure 12:
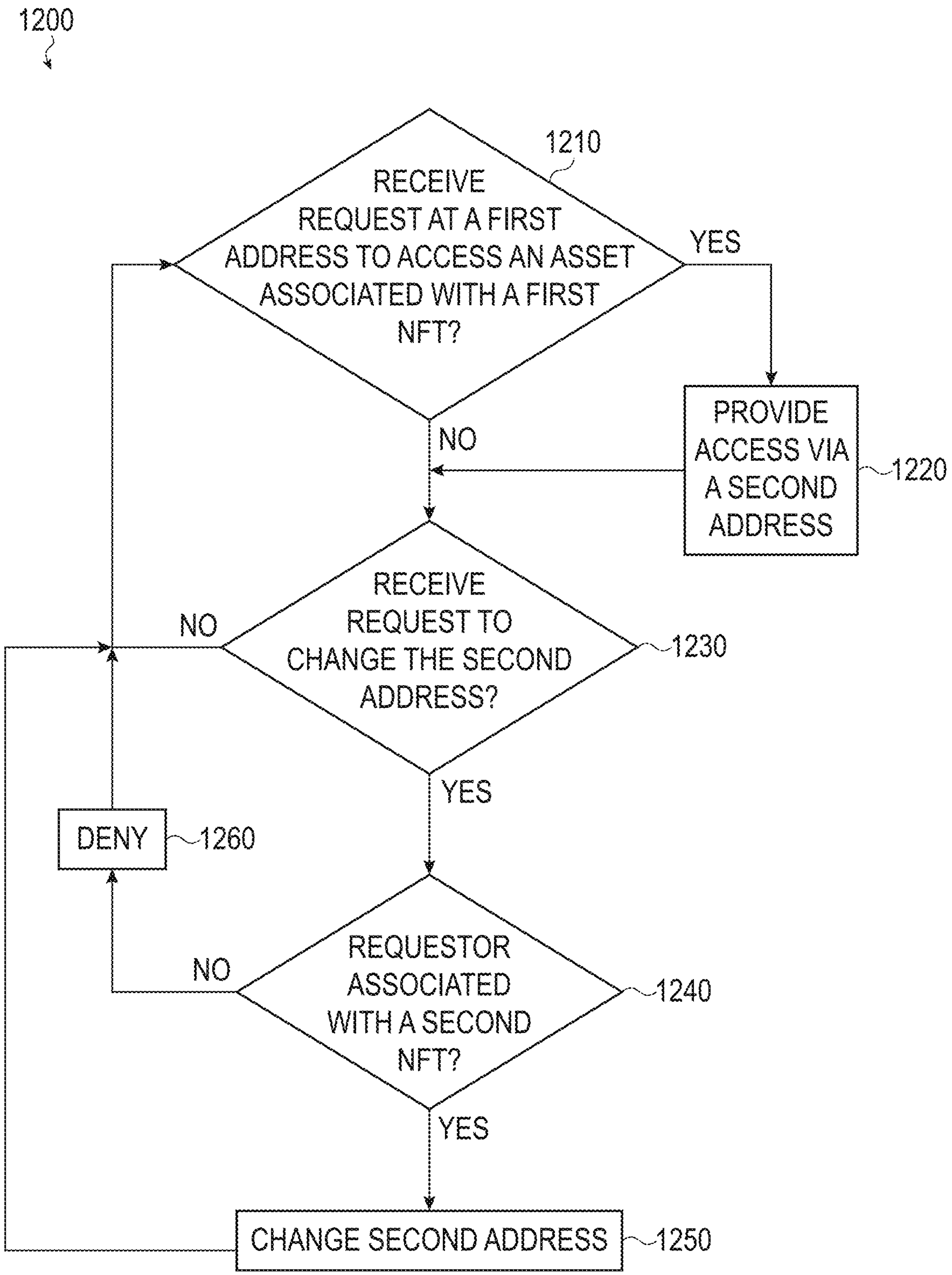
FIG. 12 depicts a flow chart illustrating a tenth example method related to directory services for one or more non-fungible tokens. This method may be performed by the system of FIG. 1A.

FIG. 12 depicts a flow chart illustrating a tenth example method 1200 related to directory services for one or more non-fungible tokens. This method 1200 may be performed by the system 100 of FIG. 1A.

At operation 1210, an electronic device (such as one or more computing devices associated with the host platform 101 of FIG. 1A, the issuer instance 102 of FIG. 1A, the user platform 103 of FIG. 1A, and/or another device or system) may determine whether or not a request at a first address to access an asset associated with a first NFT is received. If so, the flow may proceed to operation 1220 where the electronic device may provide access via a second address before the flow proceeds to operation 1230. Otherwise, the flow may proceed directly to operation 1230.

At operation 1230, the electronic device may determine whether or not a request to change the second address is received. If so, the flow may proceed to operation 1240. Otherwise, the flow may return to operation 1210 where the electronic device may again determine whether or not a request at a first address to access an asset associated with a first NFT is received.

At operation 1240, the electronic device may determine whether or not the requestor is associated with a second NFT. If so, the flow may proceed to operation 1250 where the electronic device may change the second address before the flow returns to operation 1210 where the electronic device may again determine whether or not a request at a first address to access an asset associated with a first NFT is received. Otherwise, the flow may proceed to operation 1260 where the electronic device may deny the change before the flow returns to operation 1210 where the electronic device may again determine whether or not a request at a first address to access an asset associated with a first NFT is received.

In various examples, this example method 1200 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1200 is illustrated and described as including particular operations performed in a particular order, it is understood that this is an example. In various implementations, various orders of the same, similar, and/or different operations may be performed without departing from the scope of the present disclosure.

For example, the method 1200 illustrates and describes performing determinations at operations 1210 and 1230 in a particular sequence. However, it is understood that this is an example. In various implementations, these operations may be reversed and/or otherwise be performed in a different order. Various configurations are possible and contemplated without departing from the scope of the present disclosure.

Figure 13:
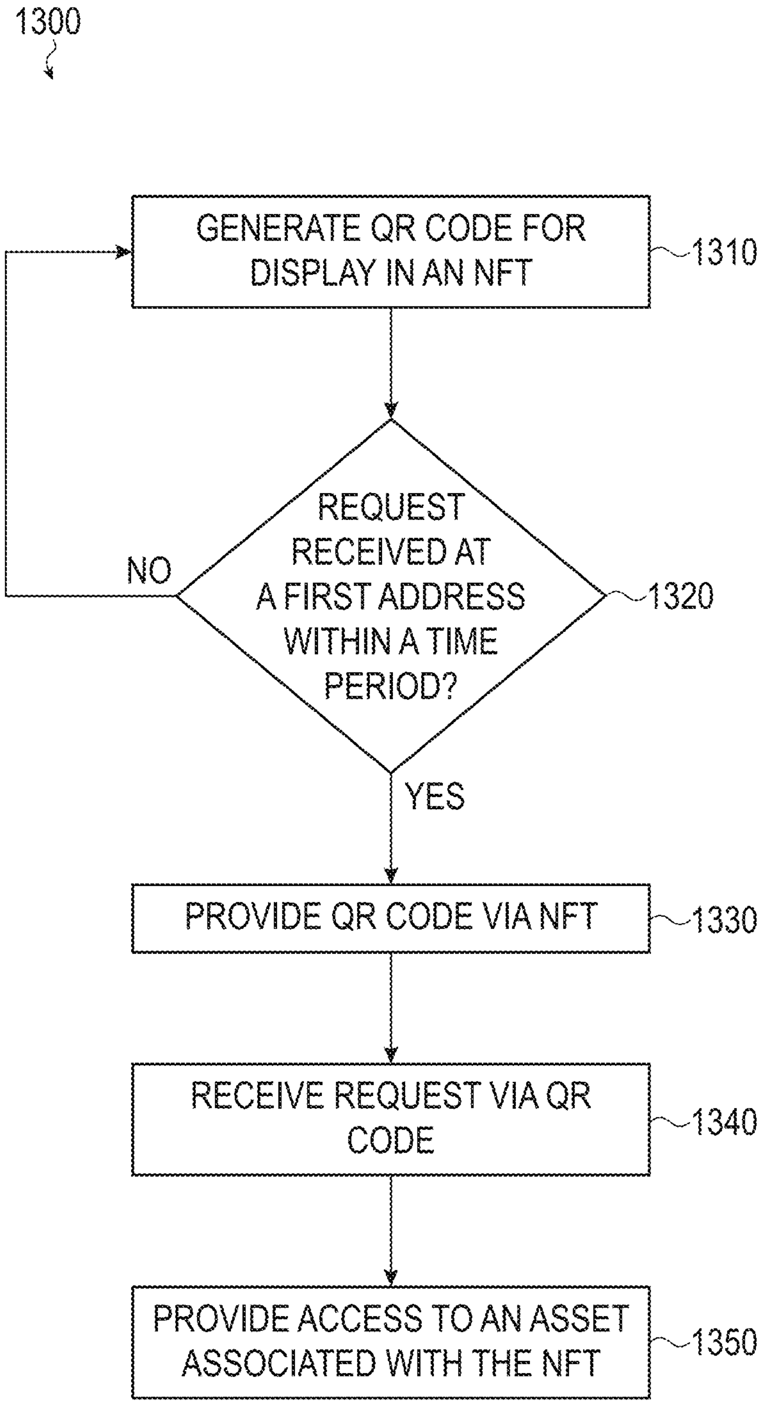
FIG. 13 depicts a flow chart illustrating an eleventh example method related to directory services for one or more non-fungible tokens. This method may be performed by the system of FIG. 1A.

FIG. 13 depicts a flow chart illustrating an eleventh example method 1300 related to directory services for one or more non-fungible tokens. This method 1300 may be performed by the system 100 of FIG. 1A.

At operation 1310, an electronic device (such as one or more computing devices associated with the host platform 101 of FIG. 1A, the issuer instance 102 of FIG. 1A, the user platform 103 of FIG. 1A, and/or another device or system) may generate a quick response (QR) code for display in an NFT. At operation 1320, the electronic device may determine whether a request is received at a first address within a time period. The time period may be thirty seconds to a minute, two minutes, an hour, and so on. If not, the flow may return to operation 1310 where the electronic device may generate another QR code for display in an NFT. Otherwise, the flow may proceed to operation 1330.

At operation 1330, the electronic device may provide the QR code via the NFT. At operation 1340, the electronic device may receive a request via the QR code. At operation 1350, the electronic device may provide access to an asset associated with the NFT.

For example, the NFT may be a digital driver's license and the QR code may be scannable to access an asset indicating that the driver's license is valid, providing a proof of age, and so on. By generating new QR codes, the electronic device can render previous QR codes invalid and ensure that the new QR codes can be used to verify that the drivers license is valid as opposed to was once valid at some historic time. By having the NFT obtain the QR code upon request, such as to display when the NFT is going to be displayed, the NFT can be generated with a reference to obtain the newly generated QR code rather than a specific QR code at the time of creation that could then not be changed. Various configurations are possible and contemplated without departing from the scope of the present disclosure.

In various examples, this example method 1300 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1300 is illustrated and described as including particular operations performed in a particular order, it is understood that this is an example. In various implementations, various orders of the same, similar, and/or different operations may be performed without departing from the scope of the present disclosure.

For example, the method 1300 illustrates and describes the same electronic device generating the QR code and providing access to the asset in response to a request received via the QR code. However, it is understood that this is an example. In various implementations, these functions may be performed by multiple electronic devices. Various configurations are possible and contemplated without departing from the scope of the present disclosure.

Figure 14:
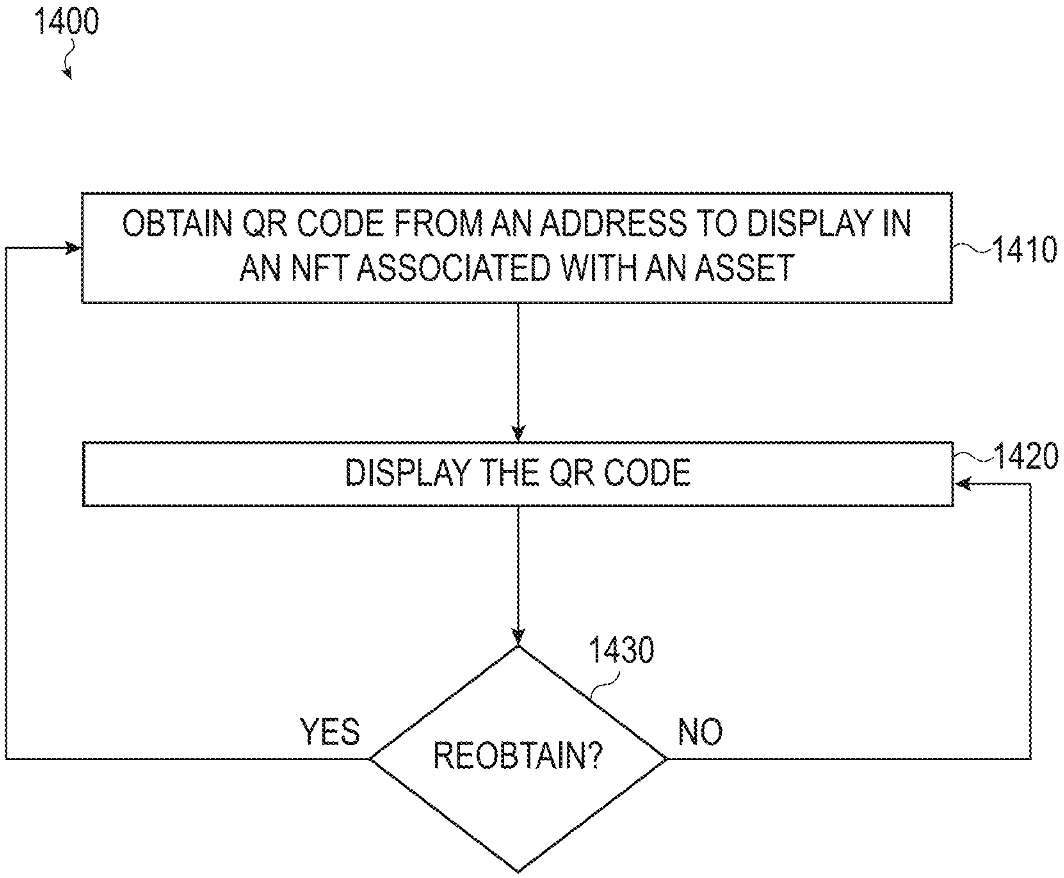
FIG. 14 depicts a flow chart illustrating a twelfth example method related to directory services for one or more non-fungible tokens. This method may be performed by the system of FIG. 1A.

FIG. 14 depicts a flow chart illustrating a twelfth example method 1400 related to directory services for one or more non-fungible tokens. This method 1400 may be performed by the system 100 of FIG. 1A.

At operation 1410, an electronic device (such as one or more computing devices associated with the host platform 101 of FIG. 1A, the issuer instance 102 of FIG. 1A, the user platform 103 of FIG. 1A, and/or another device or system) may obtain a QR code from an address to display in an NFT associated with an asset. At operation 1420, the electronic device may display the QR code. Displaying the QR code may be part of displaying the NFT. At operation 1430, the electronic device may determine whether or not to obtain the QR code. If not, the flow may return to operation 1420 where the electronic device may again display the QR code. Otherwise, the flow may return to operation 1410 where the electronic device may again obtain the QR code.

In various examples, this example method 1400 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1400 is illustrated and described as including particular operations performed in a particular order, it is understood that this is an example. In various implementations, various orders of the same, similar, and/or different operations may be performed without departing from the scope of the present disclosure.

For example, the method 1400 illustrates and describes the electronic device displaying the obtained QR code until a new one is obtained. However, it is understood that this is an example. In various implementations, the electronic device may display an obtained QR code upon request until a new one is obtained instead of constantly displaying the obtained QR code until a new one is obtained. Various configurations are possible and contemplated without departing from the scope of the present disclosure.

Figure 15:
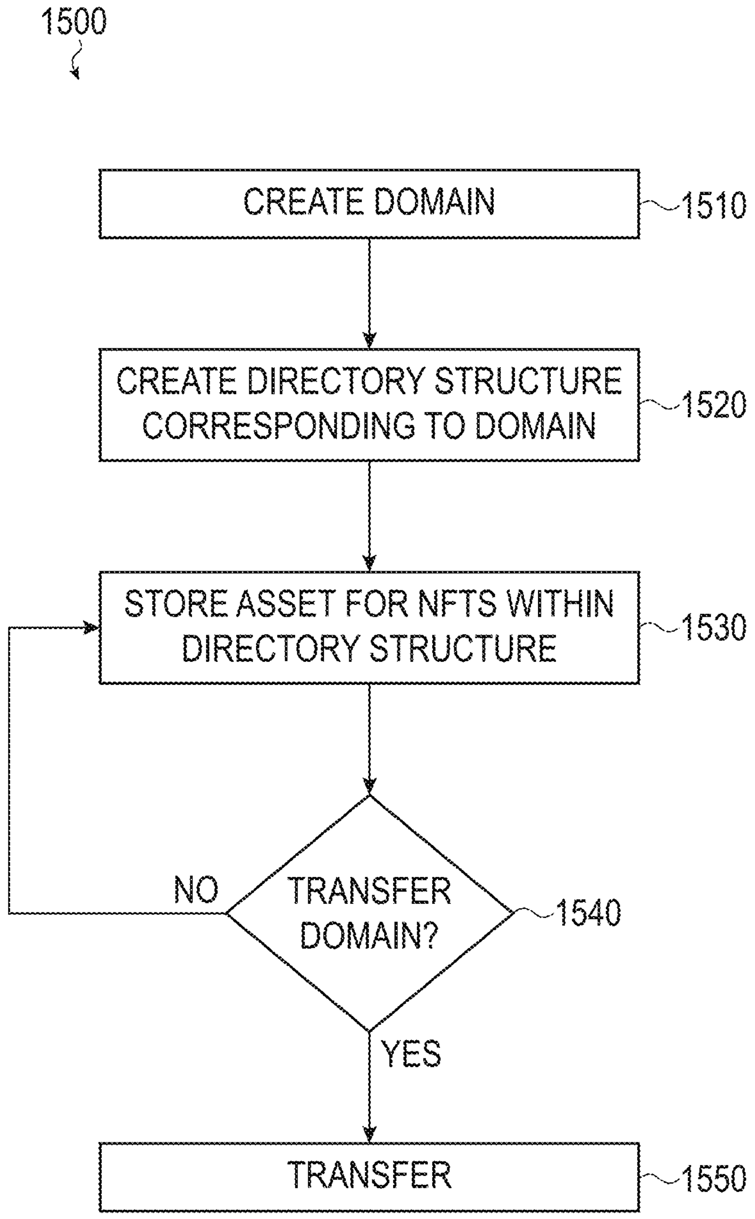
FIG. 15 depicts a flow chart illustrating a thirteenth example method related to directory services for one or more non-fungible tokens. This method may be performed by the system of FIG. 1A.

FIG. 15 depicts a flow chart illustrating a thirteenth example method 1500 related to directory services for one or more non-fungible tokens. This method 1500 may be performed by the system 100 of FIG. 1A.

At operation 1510, an electronic device (such as one or more computing devices associated with the host platform 101 of FIG. 1A, the issuer instance 102 of FIG. 1A, the user platform 103 of FIG. 1A, and/or another device or system) may create a domain. For example, the domain may be "Customer1." The domain may be linked to a physical address in a domain name registration such that queries to the domain are resolved by a domain name server to the physical address.

At operation 1520, the electronic device may create a directory structure corresponding to a domain. For example, the domain may be "Customer1" and may include the directory structure "Customer1/NFT1" and "Customer1/NFT2."

At operation 1530, the electronic device may store one or more assets for one or more NFTs within the directory structure. For example, "Customer1" may then include "Customer1/NFT1/asset1" and "Customer1/NFT2/asset2."

At operation 1540, the electronic device may determine whether or not to transfer the domain. If not, the flow may return to operation 1530 where the electronic device may continue to store one or more assets for one or more NFTs within the directory structure. Otherwise, the flow may proceed to operation 1550.

At operation 1550, the electronic device may transfer the domain. This may include transferring the one or more assets for the one or more NFTs stored within the directory structure. Alternatively or additionally, this may include changing the domain name registration of the domain with one or more domain name servers. Various configurations are possible and contemplated without departing from the scope of the present disclosure.

The method 1500 may enable one or more entities to store assets in a structure under a descriptive name (i.e., the domain). The domain may be assigned to a first location where the assets are stored, but may be transferred to one or more additional locations when desired. For example, Customer1 may store all their assets under a domain "Customer1" at a first location to describe that the assets all belong to Customer1. This domain may be later reassigned to point to a second location so that the assets are portable. Various configurations are possible and contemplated without departing from the scope of the present disclosure.

Additionally, subdomains may be used so that different assets may be grouped under different descriptive names (i.e., the subdomains) that may then be separately transferred. For example, Customer1 may store all their streaming account control assets under a first subdomain "streamingaccesscontrol.Customer1" and all their directory service assets under a second subdomain "directoryservices.Customer1," both at a first location (in this example) to describe that the streaming account control assets are streaming account control assets and the directory service assets are directory service assets. Either or both subdomains may be later reassigned to point to one or more second locations so that the respective groups of assets are separately portable. Various configurations are possible and contemplated without departing from the scope of the present disclosure.

In various examples, this example method 1500 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1500 is illustrated and described as including particular operations performed in a particular order, it is understood that this is an example. In various implementations, various orders of the same, similar, and/or different operations may be performed without departing from the scope of the present disclosure.

For example, the method 1500 illustrates and describes the same electronic device creating the domain, creating a directory structure corresponding to the domain, storing one or more assets for one or more NFTs, determining whether or not to transfer the domain, and transferring the domain. However, it is understood that this is an example. In various implementations, various electronic devices may perform some but not all of the above operations. Various configurations are possible and contemplated without departing from the scope of the present disclosure.

Figure 16:
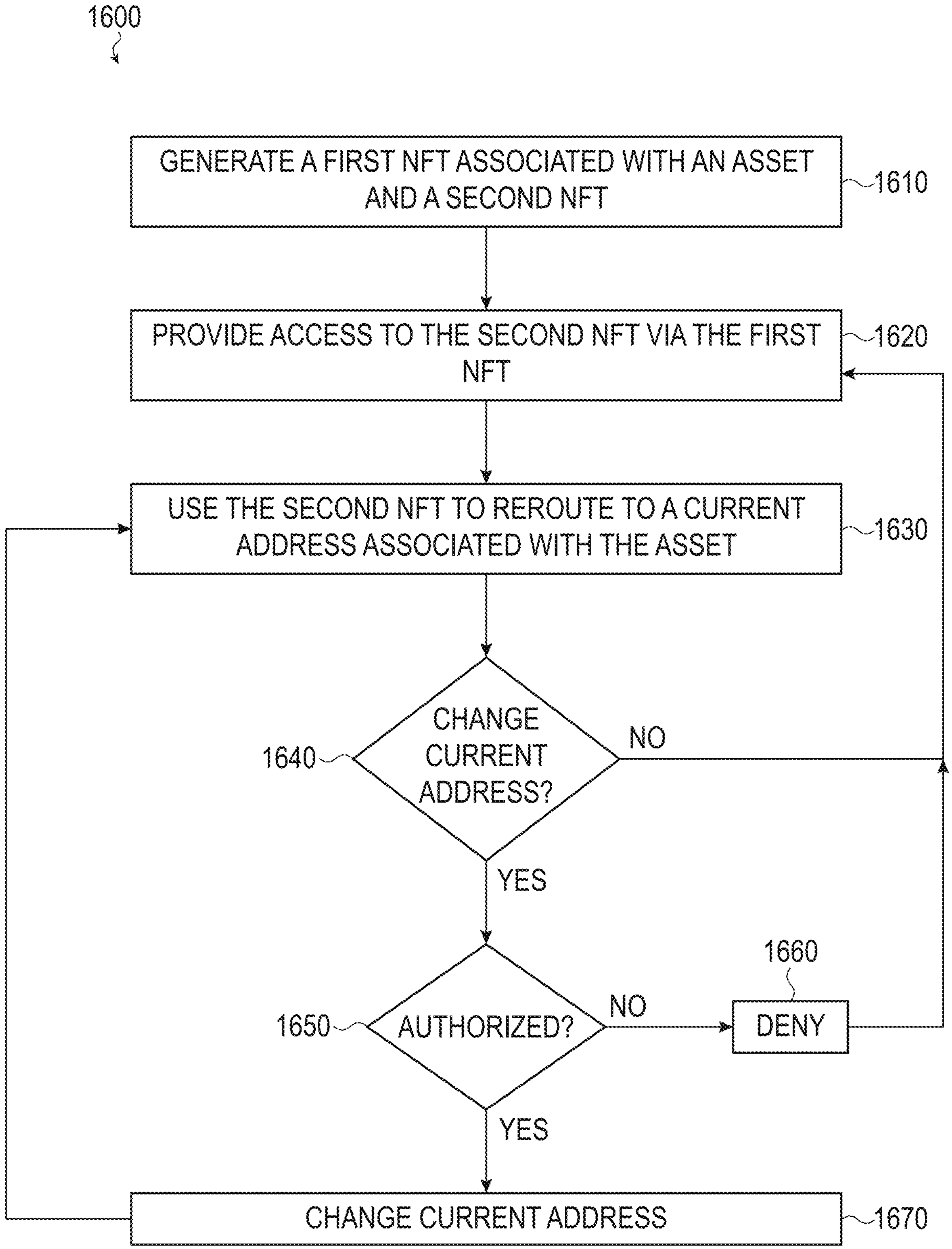
FIG. 16 depicts a flow chart illustrating a fourteenth example method related to directory services for one or more non-fungible tokens. This method may be performed by the system of FIG. 1A.

FIG. 16 depicts a flow chart illustrating a fourteenth example method 1600 related to directory services for one or more non-fungible tokens. This method 1600 may be performed by the system 100 of FIG. 1A.

At operation 1610, an electronic device (such as one or more computing devices associated with the host platform 101 of FIG. 1A, the issuer instance 102 of FIG. 1A, the user platform 103 of FIG. 1A, and/or another device or system) may generate a first NFT associated with an asset and a second NFT. The first NFT may be associated with the asset via the second NFT. At operation 1620, the electronic device may provide access to the second NFT via the first NFT. For example, the first NFT may point to the second NFT. At operation 1630, the electronic device may use the second NFT to reroute to a current address associated with the asset. This may be performed using the smart contract associated with the second asset.

At operation 1640, the electronic device may determine whether or not to change the current address. The electronic device may make such a determination based upon receipt of a request to do so, whether or not the request is authorized 1650, and so on. If the electronic device determines to change the current address, the flow may proceed to operation 1670 where the electronic device may change current address. Otherwise, the flow may proceed to operation 1660 where the electronic device may deny the request.

In various examples, this example method 1600 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1600 is illustrated and described as including particular operations performed in a particular order, it is understood that this is an example. In various implementations, various orders of the same, similar, and/or different operations may be performed without departing from the scope of the present disclosure.

For example, the method 1600 illustrates and describes the same electronic device creating the NFTs, providing access to the NFTs, rerouting, and changing the current address. However, it is understood that this is an example. In various implementations, various electronic devices may perform one or more of these operations. For example, one electronic device may create the NFTs, provide access to the NFTs, and perform the rerouting while another electronic device changes the current address. Various configurations are possible and contemplated without departing from the scope of the present disclosure.

By way of another example, the method 1600 illustrates and describes two NTFs. However, it is understood that this is an example. In various implementations, similar operations may be performed using three or more NFTs. Various configurations are possible and contemplated without departing from the scope of the present disclosure.

The above illustrates and describes techniques for implementing directory services for assets associated with NFTs. However, it is understood that these are examples. Other implementations are possible and contemplated without departing from the scope of the present disclosure where these techniques are used to implement directory services for other data associated with NFTs other than assets, such as one or more components of one or more smart contracts associated with one or more NFTs.

For example, in some implementations a first portion of a smart contract associated with an NFT may be incorporated into the NFT and/or otherwise stored on the blockchain associated with the NFT while a second portion of the smart contract is stored elsewhere and is accessible using the directory service techniques discussed above. The second portion of the smart contract may be accessible via the same address as the asset and/or the NFT may include one or more other addresses that may be used to access the second portion of the smart contract via the directory service techniques discussed above. By way of illustration, the first portion may include one or more components of the smart contract operable to perform the directory services and/or authentication while the second portion of the smart contract may include one or more components of the smart contract operable to perform one or more other functions. As the first portion is incorporated into the NFT and/or otherwise stored on the blockchain associated with the NFT, the first portion may be immutable. However, the second portion being stored outside of the NFT or the blockchain associated with the NFT, may be changeable.

In a first example implementation, the NFT may be associated with a membership program and the second portion of the smart contract may include one or more components associated with one or more expiration dates associated with the membership program, terms and conditions associated with the membership program, and so on. In this way, the expiration date, terms and conditions, and so on returned by the one or more components may be changeable without having to revoke the NFT and generate a new one.

In a second example implementation, the NFT may be associated with a driver's license and the second portion of the smart contract include one or more components associated with when the driver's license expires, restrictions on the driver's license, and so on. In this way, the driver's license expiration date, restrictions on the driver's license, and so on returned by the one or more components may be changeable, such as where a driver did not previously require eyeglasses for driving but now requires eyeglasses for driving, without having to revoke the NFT and generate a new one.

By way of another example, a first smart contract references a second smart contract at a first address. A directory service routes requests to execute the second smart contract from the first address to a second address where the second smart contract is stored. The directory service may be implemented using any of the techniques discussed herein. This enables the second smart contract to be moved, modified, replaced, and so on despite the reference to the first address in the first smart contract being fixed without requiring the first smart contract to be replaced.

Figure 17:
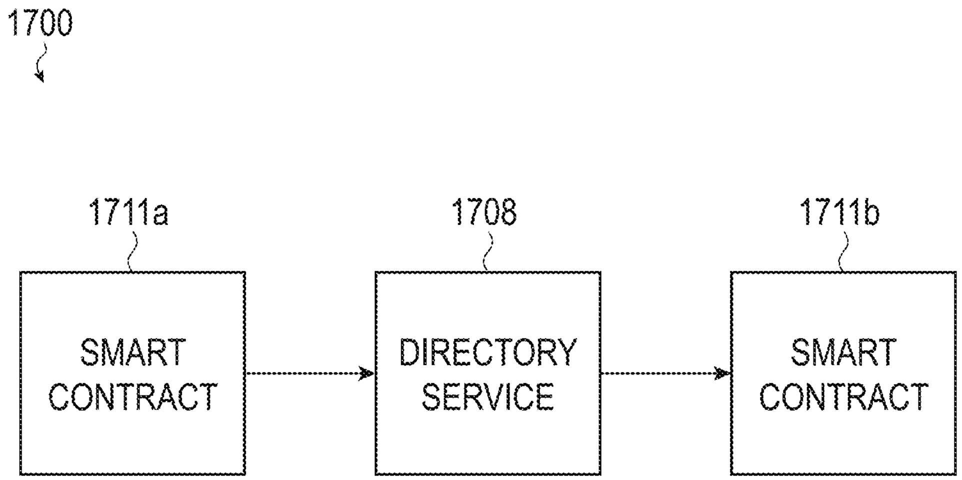
FIG. 17 depicts example relationships between smart contracts and a directory service.

FIG. 17 depicts example relationships 1700 between smart contracts and a directory service. As shown, a directory service 1708 may be used to route requests from a first address referenced by a first smart contract 1711*a* to a second address where a second smart contract 1711*b* is stored. The directory service may be implemented using one or more systems, smart contracts, NFTs, and/or any other techniques discussed herein. The directory service 1708 may be operable to change the routing to route to the second smart contract 1711*b* and/or a different smart contract in the event that the second smart contract 1711*b* is moved, modified, replaced, and so on.

For example, the second smart contract 1711*b* may implement an application programming interface (API), service, and so on and the first smart contract 1711*a* may thus implement a gateway to that API, service, or the like. By way of illustration, the second smart contract 1711*b* may implement an API, service, or the like that maintains a rewards program and the first smart contract 1711*a* may thus implement a gateway to that rewards program API, service, or the like.

Figure 18:
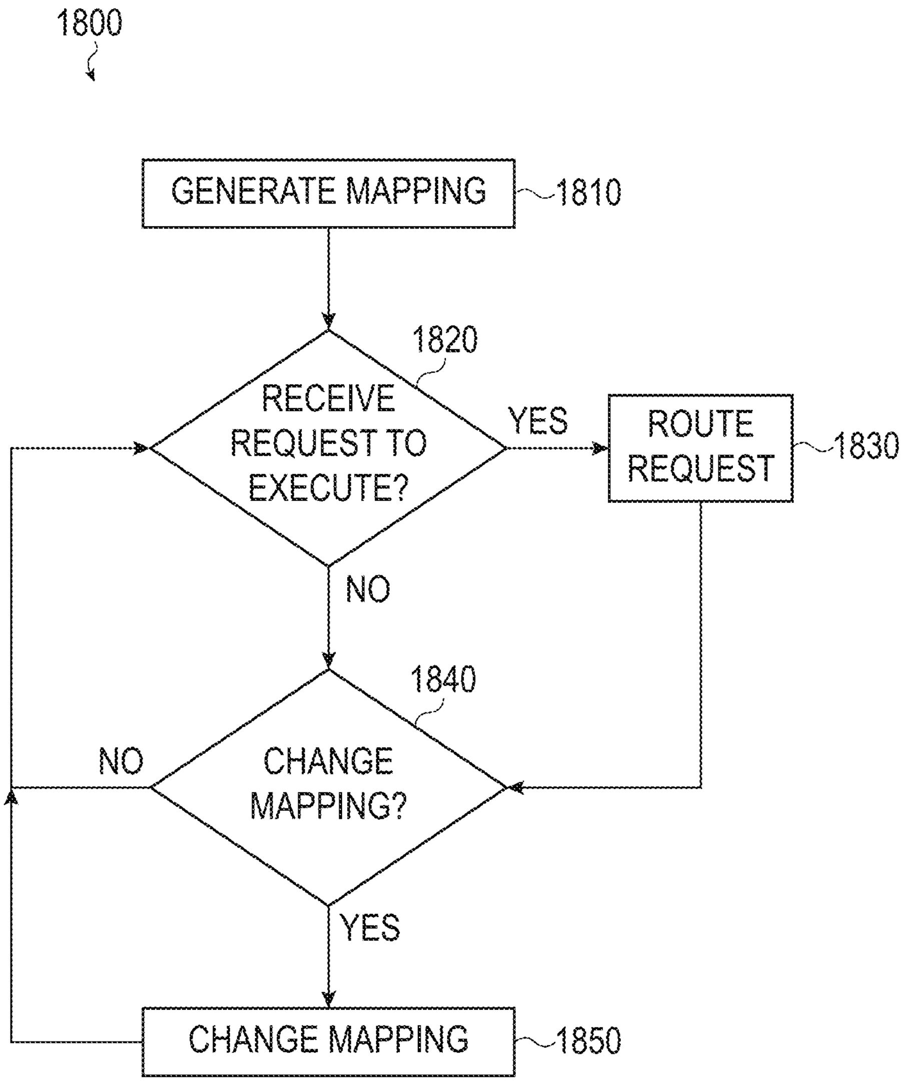
FIG. 18 depicts a flow chart illustrating a first example method related to directory services for one or more smart contracts. This method may be performed by the system of FIG. 1A.

FIG. 18 depicts a flow chart illustrating a first example method 1800 related to directory services for one or more non-fungible tokens. This method 1800 may be performed by the system 100 of FIG. 1A.

At operation 1810, an electronic device (such as one or more computing devices associated with the host platform 101 of FIG. 1A, the issuer instance 102 of FIG. 1A, the user platform 103 of FIG. 1A, and/or another device or system) may generate a mapping. The mapping may be between a first address at which a first smart contract references a second smart contract and a second address at which the second smart contract is stored, such as on at least one blockchain. The first smart contract may be stored on the at least one blockchain, on at least one or more other blockchains, and so on.

In some implementations, the mapping may be a third smart contract that references the second address. The third smart contract may be editable to change the second address. In this way, the third smart contract may be used to implement the directory service and/or may be used by a directory service to maintain mappings. Various configurations are possible and contemplated without departing from the scope of the present disclosure.

In various implementations, the mapping may be at least one NFT and/or at least one asset associated with the at least one NFT that references the second address. The at least one NFT and/or at least one asset associated with the at least one NFT may be editable to change the second address. In this way, the at least one NFT and/or at least one asset associated with the at least one NFT may be used to implement the directory service and/or may be used by a directory service to maintain mappings. Various configurations are possible and contemplated without departing from the scope of the present disclosure.

At operation 1820, the electronic device may determine whether a request to execute is received. The request to execute may be a request to execute the second smart contract and may be received at the first address. If so, the flow may proceed to operation 1830. Otherwise, the flow may proceed to operation 1840.

At operation 1830, the electronic device may route the request. The request may be routed from the first address to the second address. The request may be routed using the mapping.

At operation 1840, the electronic device may determine whether or not to change the mapping. The electronic device may determine to change the mapping in response to receiving a request to change the mapping. If so, the flow may proceed to operation 1850 where the electronic device may change the mapping. Otherwise, the flow may return to operation 1820 where the electronic device may again determine whether a request to execute is received.

In a number of implementations, the second smart contract may implement an API, service, or the like. In such implementations, the second smart contract may implement a gateway to that API, service, or the like. Various configurations are possible and contemplated without departing from the scope of the present disclosure.

In some implementations, one or more NFTs may be associated with the first smart contract and/or the second smart contract. In other implementations, the first smart contract and/or the second smart contract may not be associated with any NFTs. Various configurations are possible and contemplated without departing from the scope of the present disclosure.

In various implementations, the first smart contract and the second smart contract may be code compatible. Lack of code compatibility may not prevent the first smart contract from referencing the second smart contract, but may prevent execution of the second smart contract in response to execution of the first smart contract. Various configurations are possible and contemplated without departing from the scope of the present disclosure.

In various examples, this example method 1800 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1800 is illustrated and described as including particular operations performed in a particular order, it is understood that this is an example. In various implementations, various orders of the same, similar, and/or different operations may be performed without departing from the scope of the present disclosure.

For example, the method depicts operations 1820 and 1840 as sequential, linearly performed operations. However, it is understood that this is an example. In other implementations, these operations may be performed in other orders, omitted, and so on. Various configurations are possible and contemplated without departing from the scope of the present disclosure.

Figure 19:
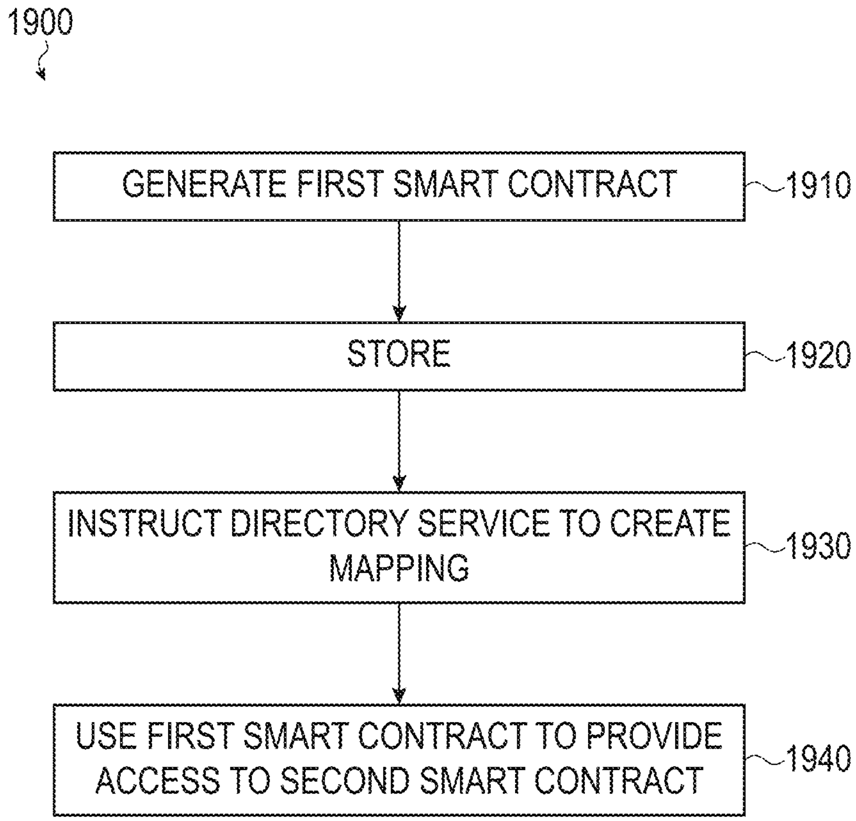
FIG. 19 depicts a flow chart illustrating a second example method related to directory services for one or more smart contracts. This method may be performed by the system of FIG. 1A.

FIG. 19 depicts a flow chart illustrating a second example method 1900 related to directory services for one or more smart contracts. This method 1900 may be performed by the system 100 of FIG. 1A.

At operation 1910, an electronic device (such as one or more computing devices associated with the host platform 101 of FIG. 1A, the issuer instance 102 of FIG. 1A, the user platform 103 of FIG. 1A, and/or another device or system) may generate a first smart contract. The first smart contract may reference a second smart contract via a first address.

At operation 1920, the electronic device may store the first smart contract. The first smart contract may be stored on at least one blockchain.

At operation 1930, the electronic device may instruct a directory service to create a mapping. The mapping may be a directory service mapping. The mapping may map between the first address and a second address. The second address may be where a second smart contract is stored.

At operation 1940, the electronic device may use the first smart contract to provide access to the second smart contract. the electronic device may use the first smart contract to provide access to the second smart contract via the mapping.

In various examples, this example method 1900 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 1900 is illustrated and described as including particular operations performed in a particular order, it is understood that this is an example. In various implementations, various orders of the same, similar, and/or different operations may be performed without departing from the scope of the present disclosure.

For example, in some implementations, the method may include one or more additional operations. Such an additional operation may include instructing the directory service to update the second address of the mapping to a third address (which may be performed by executing a third smart contract), moving the second smart contract from the second address to the third address, storing a third smart contract at the third address, determining whether or not the first smart contract and the second smart contract are code compatible, and so on. Various configurations are possible and contemplated without departing from the scope of the present disclosure.

Figure 20:
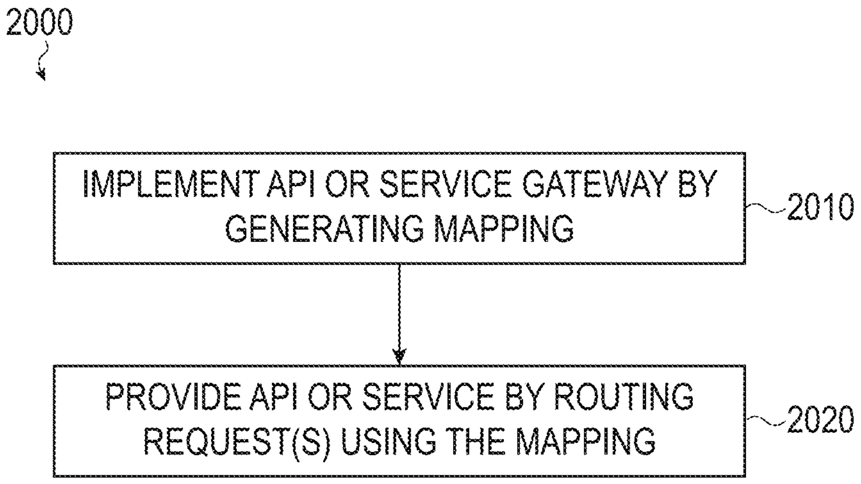
FIG. 20 depicts a flow chart illustrating a third example method related to directory services for one or more smart contracts. This method may be performed by the system of FIG. 1A.

FIG. 20 depicts a flow chart illustrating a third example method 2000 related to directory services for one or more smart contracts. This method 2000 may be performed by the system 100 of FIG. 1A.

At operation 2010, an electronic device (such as one or more computing devices associated with the host platform 101 of FIG. 1A, the issuer instance 102 of FIG. 1A, the user platform 103 of FIG. 1A, and/or another device or system) may implement an API or service gateway by generating a mapping. The mapping may be between a first address at which a first smart contract references a second smart contract and a second address at which the second smart contract is stored on at least one blockchain.

At operation 2020, the electronic device may provide the API or service by routing one or more requests. The request may be to execute the second smart contract. The routing may be performed using the mapping. The routing may be from the first address to the second address.

In various examples, this example method 2000 may be implemented as a group of interrelated software modules or components that perform various functions discussed herein. These software modules or components may be executed within a cloud network and/or by one or more computing devices, such as one or more computing devices associated with the host platform 101 of FIG. 1A, the issuer instance 102 of FIG. 1A, the user platform 103 of FIG. 1A, and/or another device or system.

Although the example method 2000 is illustrated and described as including particular operations performed in a particular order, it is understood that this is an example. In various implementations, various orders of the same, similar, and/or different operations may be performed without departing from the scope of the present disclosure.

For example, in some implementations, the method may include one or more additional operations. Such an additional operation may include updating the mapping, determining that the request is authorized prior to routing the request (such as by determining that an authorization NFT is associated with a token wallet associated with a requestor, receiving a one-time password and/or other authorization credential, or the like), and so on. Updating the mapping may change the second address to a third address. The mapping may be updated in response to generation of a new version of the second smart contract.

In various implementations, a method may include generating a non-fungible token (NFT) that is associated with an asset and includes a reference for obtaining a quick response (QR) code via at least one communication network to display via a display device, generating the QR code to provide in response to a request received over the at least one communication network via the reference, storing the QR code in at least one non-transitory storage medium, providing the QR code via the at least one communication network in response to the request, generating a new QR code to replace the QR code upon expiration of a time period. storing the new QR code in the at least one non-transitory storage medium and replacing the QR code with the new QR code upon expiration of the time period.

In some examples, the asset may include driver's license information. In a number of examples, the method may further include providing the asset in response to an additional request submitted via the QR code. In various examples, the QR code may be unusable to access the asset after replacement.

In a number of examples, the asset may be a redacted version of the asset. In various such examples, the method may further include providing an unredacted version of the asset in response to verifying that a requestor is authorized.

In some implementations, a method may include generating a non-fungible token (NFT) that is associated with an asset, storing the asset in at least one non-transitory storage medium, implementing a directory service that causes at least one electronic device to route requests received via at least one communication network from a first address specified in the NFT to a second address where the asset is stored in the at least one non-transitory storage medium, instructing the directory service to change the second address in response to an authorized change request received via the at least one communication network, and providing access to the directory service via the NFT.

In various examples, the directory service may be implemented via an additional NFT. In some such examples, the second address may be changed via a smart contract associated with the additional NFT. In a number of such examples, the smart contract may route the requests from the first address to the second address. In various such examples, the additional NFT may be stored at the first address.

In some examples, the directory service may be implanted via a directory service server. In various examples, the directory service may select between multiple versions of the asset when routing the requests from the first address to the second address.

In a number of implementations, a system includes a non-transitory storage medium storing instructions and a processor. The processor executes the instructions to generate an NFT associated with an asset, store the asset in at least one non-transitory storage medium, route requests for the asset received via at least one communication network from a first address specified in the NFT to a second address where the asset is stored in the at least one non-transitory storage medium, change the second address in response to an authorized change request received via the at least one communication network.

In some examples, the processor may be a component of a directory service server.

In various examples, the processor may determine that there are multiple versions of the asset when a request is received and selects a version of the multiple versions to which to provide access. In a number of such examples, the multiple versions may be identical and the processor may select the version upon determining that another version is unavailable. In some such examples, a first version of the multiple versions may be a redacted version, a second version of the multiple versions may be an unredacted version, and the processor may select the version according to an authorization level of a requestor. In various such examples, the processor may verify the authorization level of the requestor by verifying that an additional NFT is associated with a token wallet that is associated with the requestor. In some such examples, a first version of the multiple versions may be at least partially encrypted, a second version of the multiple versions may be less encrypted than the first version, and the processor may select the version according to an authorization level of a requestor.

In various implementations, a system may include a non-transitory storage medium that stores instructions and a processor. The processor may execute the instructions to generate a mapping between a first address at which a first smart contract references a second smart contract and a second address at which the second smart contract is stored on at least one blockchain; receive a request to execute the second smart contract at the first address in response to execution of the first smart contract; route the request to execute the second smart contract from the first address to the second address using the mapping; and change the mapping to map the first address to a third address in response to an authorized change request received via at least one communication network.

In some examples, the first smart contract may be stored on the at least one blockchain.

In a number of examples, the mapping may be a third smart contract that references the second address. In various examples, the mapping may be at least one non-fungible token (NFT) or an asset associated with the at least one NFT.

In some examples, the second smart contract may implement at least one of an application programming interface or a service. In a number of examples, the first smart contract and the second smart contract may be stored on different blockchains. In various examples, at least one of the first smart contract or the second smart contract may be associated with at least one NFT. In a number of examples, the first smart contract and the second smart contract may be code compatible.

In some implementations, a method may include generating a first smart contract that references a second smart contract via a first address; storing the first smart contract on at least one blockchain; instructing a directory service to generate a directory service mapping between the first address and a second address where the second smart contract is stored; and using the first smart contract to provide access to the second smart contract via the directory service mapping.

In various examples, the method may further include implementing at least one of an application programming interface or a service using the second smart contract.

In some examples, the method may further include instructing the directory service to update the second address of the directory service mapping to a third address. In a number of examples, the method may further include moving the second smart contract from the second address to the third address. In various examples, the method may further include storing a third smart contract at the third address. In some examples, instructing the directory service to update the second address of the directory service mapping to the third address comprises executing a third smart contract.

In various examples, the directory service may be implemented via at least one NFT or an asset associated with the at least one NFT. In some examples, the method may further include determining whether the first smart contract and the second smart contract are code compatible.

In a number of implementations, a computer program product tangibly embodied in at least one non-transitory computer readable medium may include first instructions stored in the at least one non-transitory computer readable medium and executable by at least one processor to implement at least one of an application programming interface gateway or a service gateway by generating a mapping between a first address at which a first smart contract references a second smart contract and a second address at which the second smart contract is stored on at least one blockchain and second instructions stored in the at least one non-transitory computer readable medium and executable by the at least one processor to provide at least one of an application programming interface or a service by routing a request to execute the second smart contract from the first address to the second address using the mapping.

In various examples, the computer program product may further include third instructions stored in the at least one non-transitory computer readable medium and executable by the at least one processor to update the mapping to change the second address to a third address. In some examples, the mapping may be updated in response to generation of a new version of the second smart contract. In a number of examples, the computer program product may further include third instructions stored in the at least one non-transitory computer readable medium and executable by the at least one processor to determine that an NFT is associated with a token wallet associated with a requestor before routing the request.

Although the above illustrates and describes a number of embodiments, it is understood that these are examples. In various implementations, various techniques of individual embodiments may be combined without departing from the scope of the present disclosure.

As described above and illustrated in the accompanying figures, the present disclosure relates to smart contract directory services. A first smart contract references a second smart contract at a first address. A directory service routes requests to execute the second smart contract from the first address to a second address where the second smart contract is stored. This enables the second smart contract to be moved, modified, replaced, and so on despite the reference to the first address in the first smart contract being fixed without requiring the first smart contract to be replaced.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable storage medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:

a machine readable medium that stores instructions; and a processor that executes the instructions to:

generate a mapping between a first address at which a first smart contract references a second smart contract not associated with at least one blockchain corresponding to the first smart contract and a second address not associated with the at least one blockchain corresponding to the first smart contract at which the second smart contract is stored on at least one other blockchain;

receive a request to execute the second smart contract at the first address in response to execution of the first smart contract;

route the request to execute the second smart contract from the first address to the second address using the mapping; and change the mapping to map the first address to a third address in response to an authorized change request received via at least one communication network.

2. The system of claim 1, wherein the first smart contract is stored on the at least one blockchain.

3. The system of claim 1, wherein the mapping comprises a third smart contract that references the second address.

4. The system of claim 1, wherein the mapping comprises at least one non-fungible token (NFT) or an asset associated with the at least one NFT.

5. The system of claim 1, wherein the second smart contract implements at least one of an application programming interface or a service.

6. The system of claim 1, wherein the processor receives the request via a service gateway.

7. The system of claim 1, wherein at least one of the first smart contract or the second smart contract is associated with at least one non-fungible token (NFT).

8. The system of claim 1, wherein the first smart contract and the second smart contract are code compatible.

9. A method, comprising:

generating a first smart contract that references a second smart contract via a first address not associated with at least one blockchain corresponding to the first smart contract;

storing the first smart contract on the at least one blockchain;

instructing a directory service to generate a directory service mapping between the first address and a second address not associated with the at least one blockchain corresponding to the first smart contract where the second smart contract is stored; and using the first smart contract to provide access to the second smart contract via the directory service mapping.

10. The method of claim 9, further comprising implementing at least one of an application programming interface or a service using the second smart contract.

11. The method of claim 9, further comprising instructing the directory service to update the second address of the directory service mapping to a third address.

12. The method of claim 11, further comprising moving the second smart contract from the second address to the third address.

13. The method of claim 11, further comprising storing a third smart contract at the third address.

14. The method of claim 11, wherein the instructing the directory service to update the second address of the directory service mapping to the third address comprises executing a third smart contract.

15. The method of claim 9, wherein the directory service is implemented via at least one non-fungible token (NFT) or an asset associated with the at least one NFT.

16. The method of claim 9, further comprising determining whether the first smart contract and the second smart contract are code compatible.

17. A computer program product tangibly embodied in at least one non-transitory computer readable medium, comprising:

first instructions stored in the at least one non-transitory computer readable medium and executable by at least one processor to implement at least one of an application programming interface gateway or a service gateway by generating a mapping between a first address at which a first smart contract references a second smart contract not associated with at least one blockchain corresponding to the first smart contract and a second address not associated with the at least one blockchain corresponding to the first smart contract at which the second smart contract is stored on at least one other blockchain; and second instructions stored in the at least one non-transitory computer readable medium and executable by the at least one processor to provide at least one of an application programming interface or a service by routing a request to execute the second smart contract from the first address to the second address using the mapping.

18. The computer program product of claim 17, further comprising third instructions stored in the at least one non-transitory computer readable medium and executable by the at least one processor to update the mapping to change the second address to a third address.

19. The computer program product of claim 17, wherein the mapping is updated in response to generation of a new version of the second smart contract.

20. The computer program product of claim 17, further comprising third instructions stored in the at least one non-transitory computer readable medium and executable by the at least one processor to determine that a non-fungible token (NFT) is associated with a token wallet associated with a requestor before routing the request.

* * * * *